(12) United States Patent
Lee et al.

(10) Patent No.: US 10,218,058 B2
(45) Date of Patent: Feb. 26, 2019

(54) ELECTRONIC DEVICE INCLUDING ANTENNA

(71) Applicant: SAMSUNG ELECTRONICS CO., LTD., Suwon-si, Gyeonggi-do (KR)

(72) Inventors: Ki Huk Lee, Suwon-si (KR); Moo Young Kim, Seoul (KR); Min Sik Kim, Yongin-si (KR); Ho Saeng Kim, Anyang-si (KR); Dong Ryul Shin, Daegu (KR); Min Sung Lee, Suwon-si (KR); Song Hee Jung, Suwon-si (KR); Jae Bong Chun, Suwon-si (KR); Seung Jun Hyun, Seoul (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 181 days.

(21) Appl. No.: 15/435,665

(22) Filed: Feb. 17, 2017

(65) Prior Publication Data
US 2017/0237152 A1   Aug. 17, 2017

(30) Foreign Application Priority Data

Feb. 17, 2016   (KR) .......................... 10-2016-0018672

(51) Int. Cl.
*H01Q 1/24* (2006.01)
*G06F 1/16* (2006.01)
*G06F 3/041* (2006.01)
*H01Q 9/42* (2006.01)
*H01Q 5/357* (2015.01)
*H01Q 5/371* (2015.01)

(52) U.S. Cl.
CPC .......... *H01Q 1/243* (2013.01); *G06F 1/1637* (2013.01); *G06F 1/1643* (2013.01); *G06F 1/1698* (2013.01); *G06F 3/0412* (2013.01); *H01Q 5/357* (2015.01); *H01Q 5/371* (2015.01); *H01Q 9/42* (2013.01); *G06F 2203/04111* (2013.01)

(58) Field of Classification Search
CPC ........ H01Q 1/243; H01Q 5/357; H01Q 5/371; H01Q 9/42
See application file for complete search history.

(56) References Cited

U.S. PATENT DOCUMENTS

| 2010/0321325 A1 | 12/2010 | Springer et al. |
| 2012/0119955 A1 | 5/2012 | Milosavljevic et al. |

FOREIGN PATENT DOCUMENTS

| KR | 10-2010-0128310 | 12/2010 |
| KR | 10-2015-0104509 | 9/2015 |

*Primary Examiner* — Graham Smith
(74) *Attorney, Agent, or Firm* — Nixon & Vanderhye, P.C.

(57) ABSTRACT

An electronic device includes a housing comprising a first surface, a second surface, and a side surface, a touch screen display positioned inside the housing, wherein the display comprises a display panel and a touch panel that is separated from or integrated with the display panel, a conductive member (conductor) forming at least a portion of the side surface, at least one substantially transparent conductive pattern that is integrated into the display, a ground member (ground) interposed between the first surface and the second surface, a wireless communication circuit including a port electrically coupled to the conductive member, and a processor electrically coupled to the display and the wireless communication circuit. The substantially transparent conductive pattern is electrically coupled to the port of the wireless communication circuit and/or the ground member.

20 Claims, 25 Drawing Sheets

ELECTRONIC DEVICE INCLUDING ANTENNA

CROSS-REFERENCE TO RELATED APPLICATION

This application is based on and claims priority under 35 U.S.C. § 119 to a Korean patent application filed on Feb. 17, 2016 in the Korean Intellectual Property Office and assigned Serial number 10-2016-0018672, the disclosure of which is incorporated by reference herein in its entirety.

TECHNICAL FIELD

The present disclosure relates generally to an electronic device including an antenna.

BACKGROUND

An electronic device, such as a smartphone, may include an antenna for a wireless communication function. For example, an antenna may be mounted under a display panel or an antenna may be mounted in an area except for a display area of a display. Further, in recent years, as users who prefer large screens have increased, electronic devices, of which displays are larger or which include sub-displays, have been actively distributed. For example, electronic devices having full front displays, in which the displays occupy almost all areas of the front surface thereof, are being actively distributed.

When the sizes of the displays become larger or sub-displays are included, the display areas are expanded but spaces for antennas may become insufficient or it may be difficult to secure the performances of the antennas.

The above information is presented as background information only to assist with an understanding of the present disclosure.

SUMMARY

Various example of the present disclosure address at least the above-mentioned problems and/or disadvantages and provide at least the advantages described below. Accordingly, an example aspect of the present disclosure provides an electronic device that may secure the radiation performance of an antenna while including a large screen display or a sub-display.

In accordance with an example aspect of the present disclosure, an electronic device includes: a housing comprising a first surface facing a first direction, a second surface facing a second direction opposite the first direction, and a side surface at least partially surrounding a space between the first surface and the second surface, a touch screen display positioned inside the housing and exposed through the first surface, wherein the display comprises a display panel and a touch panel that is separated from or integrated with the display panel, a conductor forming at least a portion of the side surface, at least one substantially transparent conductive pattern that is integrated into the display, a ground interposed between the first surface and the second surface, a wireless communication circuit including a port electrically coupled to the conductor, and a processor electrically coupled to the display and the wireless communication circuit. The substantially transparent conductive pattern is electrically coupled to the port of the wireless communication circuit and/or the ground.

In accordance with another example aspect of the present disclosure, an electronic device includes: a housing comprising a first surface facing a first direction, a second surface facing a second direction opposite the first direction, and a side surface at least partially surrounding a portion of a space between the first surface and the second surface, a touch screen display disposed inside the housing and exposed to the outside through the first surface, wherein the display comprises a display panel and a touch panel that is separated from or integrated with the display panel, a first conductor forming at least a portion of the side surfaces, at least one other conductor that is disposed in the interior of the display and adjacent to the touch panel and comprises a substantially transparent conductive pattern, a ground located between the first surface and the second surface, a wireless communication circuit comprising a port electrically connected with the first conductor, and a processor that is electrically connected with the display and the wireless communication circuit. The substantially transparent conductive pattern is electrically connected with the port of the wireless communication circuit and/or the ground.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
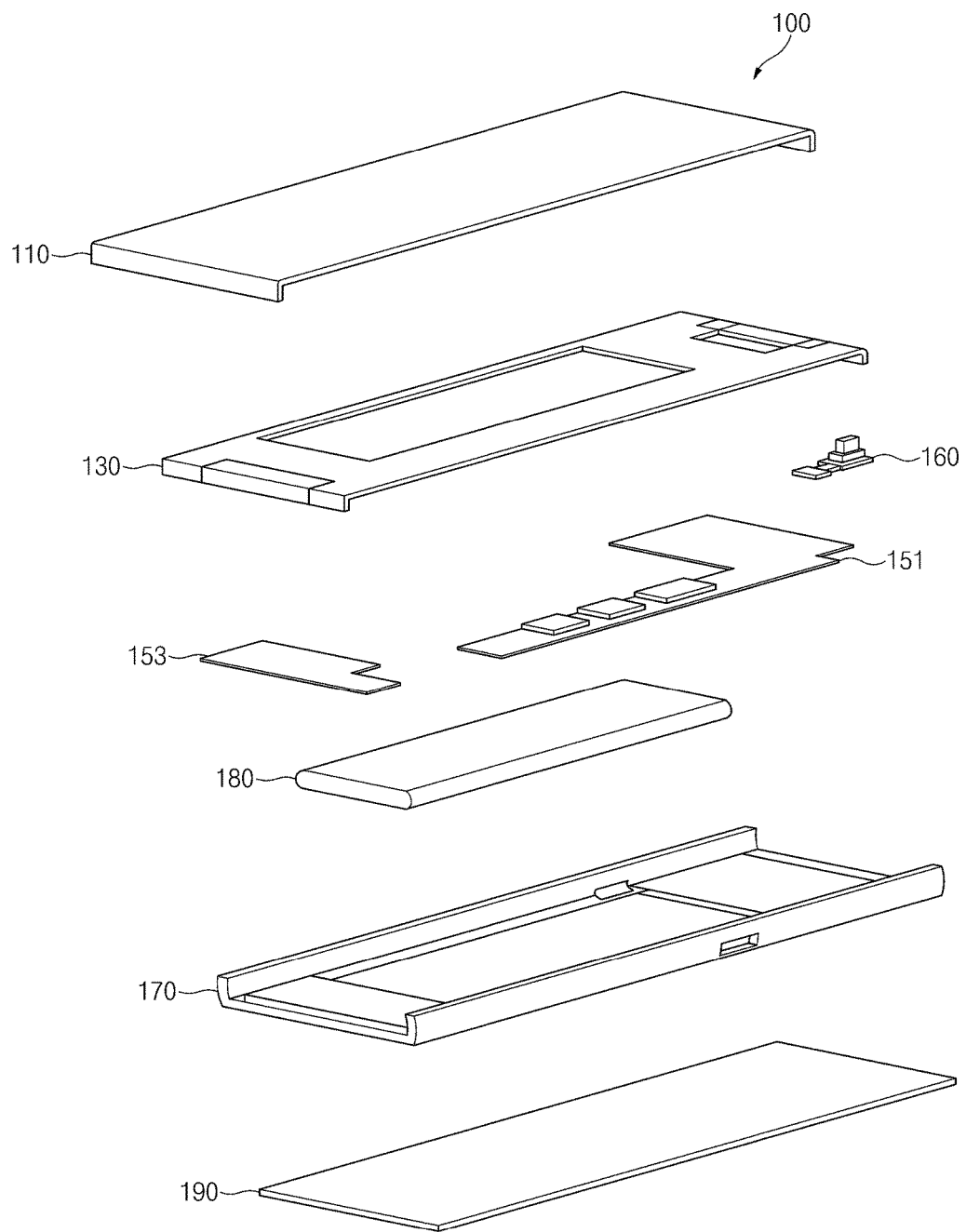
FIG. 1 is an exploded perspective view illustrating an example electronic device according to an example embodiment of the present disclosure.

Hereinafter, various example embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present disclosure are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit), or the like, but is not limited thereto.

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ or PlayStation™), an electronic dictionary, an electronic key, a camcorder, or an electronic picture frame, or the like, but is not limited thereto.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like), or the like, but is not limited thereto. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Figure 2:
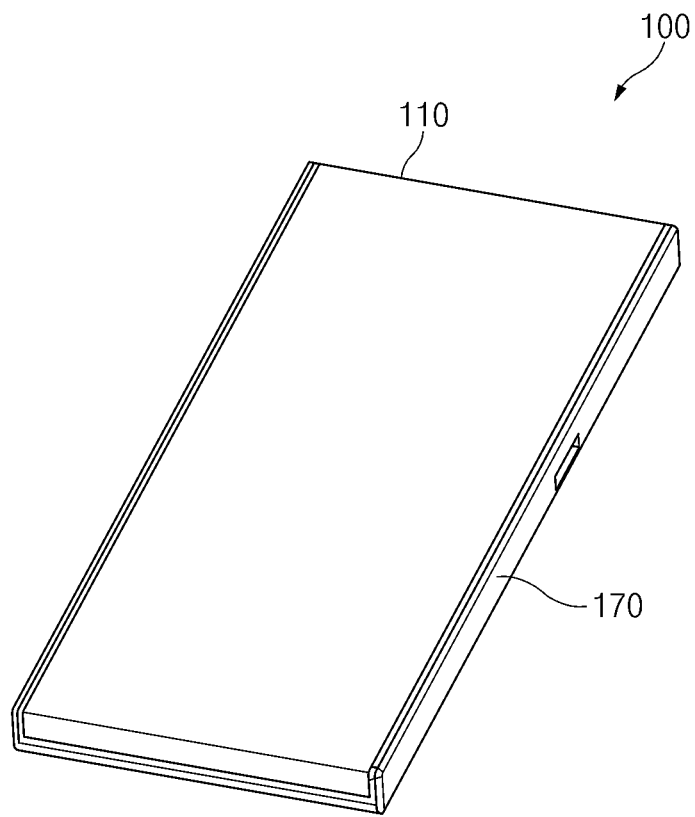
FIG. 2 is a perspective view illustrating an example electronic device according to an example embodiment of the present disclosure.

FIG. 1 is an exploded perspective view illustrating an example electronic device according to an example embodiment of the present disclosure. FIG. 2 is a perspective view illustrating an electronic device according to an example embodiment of the present disclosure.

Referring to FIGS. 1 and 2, the electronic device 100 may include a display 110, a bracket 130, a printed circuit board (e.g., a first printed circuit board 151 and a second printed circuit board 153), a functional module (e.g., a camera 160), a housing 170, a battery 180, and a rear cover 190. According to various embodiments, a front cover (or a cover glass layer) may be provided on the display 110 while covering the display 110. The front cover, for example, may define an external appearance of the electronic device 100. According to an embodiment, at least an area of the front cover may be formed of a transparent material (e.g., glass), and a screen that is output through the display 110 may be displayed to the outside through the transparent area of the front cover. According to an embodiment, the front cover may be formed of a material that has a light transmitting property, a heat-resistant property, a chemical-resistant property, and a high mechanical strength. The front cover, for example, may be a transparent film or a glass substrate that is formed of polyethyleneterephthalate, or may be a plastic substrate that is formed of polyimide, polyamide, polymethylmethacrylate, polypropylene, polyurethane, or the like.

The display 110 according to an embodiment may display various contents (e.g., a text, an image, a video, an icon, and a symbol). As another example, the display 110 may include a touch screen and receive, for example, a touch, a gesture, a proximity, or a hovering input using an electronic pen or the user's body. According to various embodiments, the display 110 may include a plurality of layers. According to an embodiment, the display 110 may include a touch detection layer, a display layer, a pressure detection layer, or the like. However, the present disclosure is not limited thereto. According to various embodiments, at least one of the layers of the display 110 may be excluded, or at least one other layer (e.g., an antenna layer or a fingerprint recognition layer) may be further included.

The touch detection layer, for example, may include a touch sensor that may detect a contact or an approach of a touch object (e.g., an electronic pen or a portion of the body of the user). According to an embodiment, the touch detection layer may be arranged in the form of a panel, and in this case, may be referred to as a touch panel. The touch sensor may include a conductive material, and may be arranged in a transverse axis (or the x axis) and a longitudinal axis (or the y axis) in the touch panel to define a lattice structure.

The display layer according to an embodiment may be arranged in the form of a panel, and may be referred to as a display panel. The display panel may have different structures and forms based on a manner of implementing colors. The display panel may include a polymer layer, a plurality of display elements that are coupled to one surface of the polymer layer, and at least one conductive line that is coupled to the polymer layer and is electrically connected with the plurality of display elements. According to an embodiment, the polymer layer may include polyimide. The plurality of display elements are arranged on one surface of the polymer layer in a matrix form to define pixels of the display panels, and may include a fluorescent material or an organic material that may express colors. According to an embodiment, the plurality of display elements may include organic light emitting diodes (OLEDs). The conductive line may include at least one gate signal line or at least one data signal line. According to an embodiment, a plurality of gate signal lines and a plurality of data signal lines are arranged in a matrix form, and the plurality of display elements may be arranged adjacent to points where lines cross each other and may be electrically connected with each other.

According to various embodiments, the display panel may be connected with a display driver IC (DDI). The display driving circuit may be electrically connected with the conductive line. The display driving circuit may include a driver IC that provides a driving signal and an image signal to the display panel, or a timing controller (T-con) that controls the driving signal and the image signal. The driver IC may include a gate driver IC that sequentially selects the gate signal lines of the display panel and applies a scan signal (or a driving signal) to the selected gate signal lines, and a data driver IC (or a source driver IC) that applies an image signal to the data signal lines of the display panel. According to an embodiment, if the gate driver IC selects a gate signal line, and applies a scan signal to the selected gate signal line to convert the corresponding display element into an active state, the data driver IC may apply an image signal to the corresponding display element through the data signal line. The timing controller may adjust a transmission time of the signal transmitted to the driver IC to prevent a difference between display times that may occur in a process of outputting the adjusted transmission time on the display panel.

The pressure detection layer, for example, may detect a pressure applied from the outside and may convert the detected pressure to an electrical signal that may be used for measurement or control. According to an embodiment, the pressure detection layer may include a pressure sensor, and in some embodiments, may include a piezoelectric element (e.g., a piezo sensor).

According to various embodiments, the display 110 may be formed on at least one surface as well as on the front surface of the electronic device 100. According to an embodiment, the display 110 may include a front surface part, a lower side surface part that extends form a lower end of the front surface part and is bent towards the rear surface of the housing 170, and an upper side surface part that extends from an upper end of the front surface part and is bent towards the rear surface of the housing 170. However, the present disclosure is not limited thereto. In some embodiments, the display 110 may further include a left side surface part that extends from a left end of the front surface part and is bent towards the rear surface of the housing 170 or a right side surface part that extends from a right end of the front surface part and is bent towards the rear surface of the housing 170.

The bracket 130 according to an embodiment may include an insulating material, and may provide a space in which at least a portion of the display 110 or the functional module may be seated. According to an embodiment, a bonding material may be applied to the bracket 130 or the bracket 130 may include a bonding layer such that at least a portion of the display 110 or the functional module may be fixed to the bracket 130. According to an embodiment, the display 110 may be seated on a front surface of the bracket 130 and the front cover may be coupled to the bracket 130 while covering a portion of a front surface of the bracket 130.

According to various embodiments, the bracket 130 may include at least one opening. According to an embodiment, at least one of the functional modules may be connected with the printed circuit board 170 through the at least one opening formed in the bracket 130. According to various embodiments, the bracket 130 may have one opening at an area other than an peripheral area thereof, and in some embodiments, the number, the form, or the locations of the openings may be differently determined according to the number, the form, or the locations of the modules, which are connected with the printed circuit board 170, of the functional modules.

According to an embodiment, the printed circuit board may be arranged under the bracket 130, and various electronic components may be mounted on the printed circuit board. For example, at least one electronic element and circuit lines may be mounted on the printed circuit board, and at least some of them may be electrically connected with each other. The electronic components, for example, may include a processor, a memory, a communication module, or a functional module (e.g., the camera 160).

According to various embodiments, the printed circuit board may be integrally formed, or a plurality of printed circuit boards may be arranged. The drawing illustrates a state in which a first printed circuit board 151 and a second printed circuit board 153 are provided. According to an embodiment, the first printed circuit board 151 and the second printed circuit board 153 may be electrically connected with each other. As another example, the printed circuit board may be a rigid printed circuit board or a flexible printed circuit board. For example, at least one of the first printed circuit board 151 or the second printed circuit board 153 may be a flexible printed circuit board (FPCB).

The functional module according to an embodiment may perform at least one of the functions provided by the electronic device 100. For example, the functional module may include a camera 160 that performs a photographing function. According to various embodiments, the functional module may include a speaker (or a receiver) that outputs a sound, a microphone that processes an input sound, a USB connector that performs an interface function for hardware communication between external devices, an earphone receptacle, or an SIM socket. According to various embodiments, at least one of the functional modules may face the display 110 through an opening formed in the bracket 130.

The housing 170 according to an embodiment may fix and support the internal components of the electronic device 100. According to an embodiment, the display 110, the bracket 130, and the printed circuit board may be sequentially stacked and may be seated on the housing 170. As another example, at least one of the functional modules may be seated in and fixed to the housing 170. According to various embodiments, the housing 170 may include a front surface, a rear surface, and side surfaces that surround at least a portion of a space between the front surface and the rear surface. According to various embodiments, as the display 110 is expanded to at least one side surface of the electronic device 100, among the side surfaces of the housing 170, an upper side surface and a lower side surface may not be formed.

According to an embodiment, the housing 170 may have an opening that passes through the front surface and the rear surface of the housing 170 such that the battery 180 may be attached to and detached from the housing 170, but the present disclosure is not limited thereto. In some embodiments, the battery 180 may be integrally formed with the housing 170 and the opening that passes through the front surface and the rear surface of the housing 170 may not be formed. According to various embodiments, the housing 170 may have at least one through-hole (or an interfacing hole) on the side surface thereof. According to an embodiment, at least one of the functional modules may be exposed to the outside through the through-hole.

According to various embodiments, at least one surface of the housing 170 may be formed of a metallic material. According to an embodiment, a side surface of the housing 170 may include a metal frame. According to various embodiments, the front cover may be detachably mounted on the housing 170. According to an embodiment, the front cover may be coupled a portion of to the side surface of the housing 170 while covering the front surface of the housing 170.

The battery 180 according to an embodiment may supply electric power to the electronic device 100. For example, the battery 180 may be electrically connected with the printed circuit board. According to an embodiment, the battery 180 may be seated inside the housing 170. According to various embodiments, the battery 180 may be integrally formed with the electronic device 100, or may be detachably mounted on the electronic device 100.

The rear cover 190 according to an embodiment may define a rear external appearance of the electronic device 100. According to various embodiments, the rear cover 190 may be detachably mounted on the housing 170. According to an embodiment, the rear cover 190 may be coupled to a portion of the side surface of the housing 170 while covering the rear surface of the housing 170.

According to various embodiments, at least one of the elements of the electronic device 100 may be excluded or at least one other element may be further included. According to an embodiment, the electronic device 100 may not include the rear cover 190, and in this case, the rear surface of the housing 170 may define an external appearance of the rear surface of the electronic device 100. According to various embodiments, the electronic device 100 may further include a ground member between the display 110 and the bracket 130. The ground member may be formed of a conductive material to provide a ground area. According to an embodiment, the ground member may be electrically connected with the display 110 to provide a ground area. According to various embodiments, the ground member may prevent heat or electronic waves generated by the display 110 from being introduced into the printed circuit board or prevent heat or electronic waves generated by the printed circuit board from being introduced into the display 110.

Figure 3:
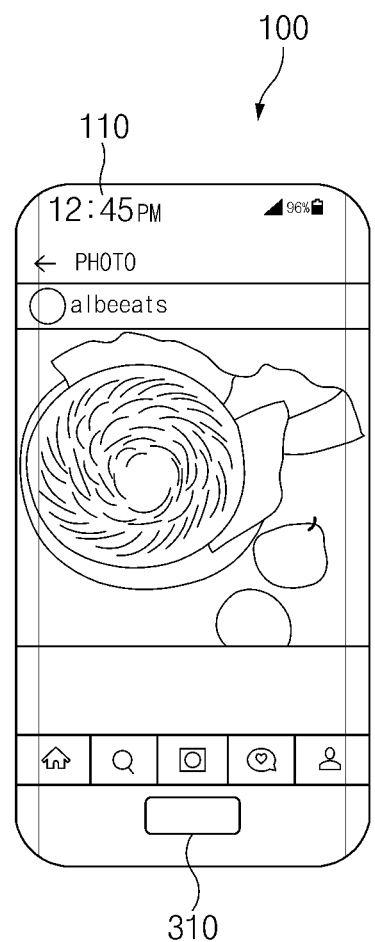
FIG. 3 is a diagram illustrating an example electronic device according to an example embodiment of the present disclosure.

FIG. 3 is a diagram illustrating an example electronic device according to an example embodiment of the present disclosure.

Referring to FIG. 3, the electronic device 100 may include a display 110. As illustrated, the display 110 may occupy the whole part of the front surface of the electronic device 100 or almost all areas of the front surface of the electronic device 100, except for a portion thereof. Accordingly, the in-use efficiency of the functional module (e.g., the camera 160) that has to be exposed to the outside through the front surface of the electronic device 100 may be increased through a software manner or a hardware manner.

According to various embodiments, in the hardware manner, the display 110 may include an opening in an area that overlaps a location of a functional module (e.g., the camera 160). Accordingly, the functional module may be exposed to the outside through the opening. According to various embodiments, in the software manner, the electronic device 100 may expose the functional module to the outside by controlling an output of a display object or making transparency different when a screen is output. For example, the electronic device 100 may output a screen in the area that overlaps the functional module when the functional module is in an inactive state or is not used even through it is in an active state. As another example, the electronic device 100 may not output a screen in the area that overlaps the functional module when the functional module is being used. Alternatively, the electronic device 100 may output a screen by lowering the transparency of the area that overlaps the functional module when the functional module is in an inactive state or is not used even though it is in an active state, and may expose the functional module to the outside by increasing the transparency of the area that overlaps the functional module, while the functional module is used. In this case, the area of the display 110, which overlaps the location of the functional module, may be formed of a transparent material. For example, at least the overlapping area of the display 110 may be formed of a transparent display. According to various embodiments, the electronic device 100 may implement a physical button, such as a home button 310, in a software way, and may output the physical button on the display 110.

Figure 4A:
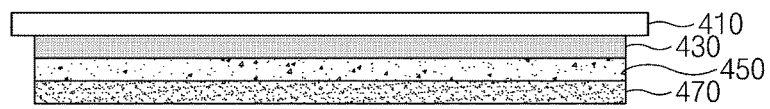
FIG. 4A is a cross sectional view illustrating an example electronic device according to an example embodiment of the present disclosure.
Figure 4B:
FIG. 4B is a cross sectional view illustrating an electronic device in which a touch panel and a front cover are integrally formed, according to an example embodiment of the present disclosure.
Figure 4C:
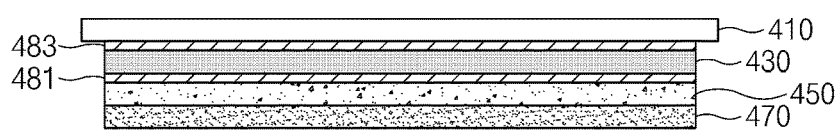
FIG. 4C is a cross sectional view illustrating an example electronic device in which a touch panel is attached to a front cover, according to an example embodiment of the present disclosure.
Figure 4D:
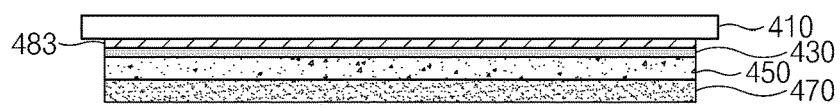
FIG. 4D is a cross sectional view illustrating an example electronic device in which a touch panel is provided in a display panel in an on-cell form, according to an example embodiment of the present disclosure.
Figure 4E:
FIG. 4E is a cross sectional view illustrating an example electronic device in which a touch panel is provided in a display panel in an in-cell form, according to an example embodiment of the present disclosure.

FIG. 4A is a cross sectional view illustrating an example electronic device according to an example embodiment of the present disclosure. FIG. 4B is a cross sectional view illustrating an example electronic device in which a touch panel and a front cover are integrally formed, according to an example embodiment of the present disclosure. FIG. 4C is a cross sectional view illustrating an example electronic device in which a touch panel is attached to a front cover, according to an example embodiment of the present disclosure. FIG. 4D is a cross sectional view illustrating an example electronic device in which a touch panel is provided in a display panel in an on-cell form, according to an example embodiment of the present disclosure. FIG. 4E is a cross sectional view illustrating an example electronic device in which a touch panel is provided in a display panel in an in-cell form, according to an example embodiment of the present disclosure.

Referring to FIGS. 4A to 4E, a front cover 410 may define an external appearance of a front surface of an electronic device (e.g., the electronic device 100). A touch panel 430 may be stacked under the front cover 410. The touch panel 430 may be formed of a transparent conductive material (e.g., an ITO electrode). However, the present disclosure is not limited thereto. The touch panel 430 may have patterns of an opaque metallic material, which are so small that they cannot be viewed by the eyes of a person. According to various embodiments, the touch panel 430 may be arranged in a glass type in which an electrode is formed in a glass substrate, a film type in which an electrode is formed in plastic and/or film, or an embedding type in which an electrode is integrated with a display panel 450. The glass type and the film type may include an external (or add-on) type that requires a separate layer between the display panel 450 and the front cover 410, and an integral type in which an electrode is implemented in the front cover 410. FIG. 4B illustrates an integral type, and FIG. 4C illustrates an add-on type. As another example, FIGS. 4D and 4E illustrate an embedding type, and FIG. 4D illustrates an on-cell type and FIG. 4E illustrates an in-cell type.

Referring to FIG. 4, the touch panel 430 may be integrally formed with the front cover 410. According to an embodiment, a Tx electrode and an Rx electrode are formed on the front cover 410 with two ITO electrode layers and an overlapping area of the Tx electrode and the Rx electrode may be separated by an insulation layer. However, the present disclosure is not limited thereto. In some embodiments, a Tx electrode and an Rx electrode may be formed on the front cover 410 with one ITO electrode layer and an insulation layer may be omitted. According to various embodiments, the display panel 450 may be attached to the touch panel 430 under the touch panel 430 through a first bonding member 481.

Referring to FIG. 4C, the touch panel 430 may be inserted between the front cover 410 and the display panel 450. According to various embodiments, the touch panel 430 may be provided in a glass type or a film type. As illustrated in the drawing, the touch panel 430 may be attached to the display panel 450 through the first bonding member 481, and may be attached to the front cover 410 through the second bonding member 483.

Referring to FIG. 4D, the touch panel 430 may be directly implemented on the display panel 450. According to an embodiment, an ITO electrode may be formed in the upper end glass of the display panel 450. Further, the display panel 450 having the touch panel 430 may be attached to the front cover 410 through the second bonding member 483.

Referring to FIG. 4E, the touch panel 430 may be formed in the interior of the display panel 450. According to an embodiment, an ITO electrode may be formed in a thin film transistor (TFT) of the display panel 450. Further, the display panel 450 having the touch panel 430 therein may be attached to the front cover 410 through the second bonding member 483.

According to various embodiments, a pressure sensor 470 may be attached under the display panel 450. According to various embodiments, the pressure sensor 470 may be formed in the same layer as the touch panel 430, and in some embodiments, may be stacked on or under the touch panel 430 to be formed on the display panel 450. According to various embodiments, a digitizer may be formed under the pressure sensor 470. The digitizer may detect an approach or a contact of an electronic pen (e.g., a stylus) that supports an electromagnetic resonance (EMR) type. According to an embodiment, the digitizer may include a conductive circuit pattern that may detect an external electromagnetic force. For example, the digitizer may detect an electromagnetic force that is emitted from the stylus based on the conductive circuit pattern, and may help determine a point at which the detected electromagnetic force is highest as a touch coordinate. In some embodiments, the pressure sensor 470 may replace the function of the digitizer. For example, the pressure sensor 470 may detect a pressure that is generated when it is pressed by a touch object (e.g., an electronic pen or a portion of the user's body) and help determine a point at which the detected pressure is highest as a touch coordinate.

Figure 5A:
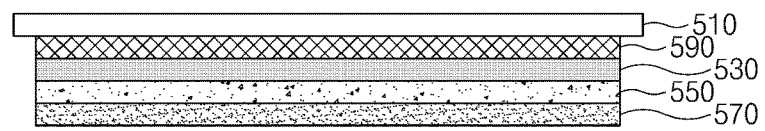
FIG. 5A is a cross sectional view illustrating an example electronic device that includes an antenna that overlaps a display area of a display according to an example embodiment of the present disclosure.
Figure 5B:
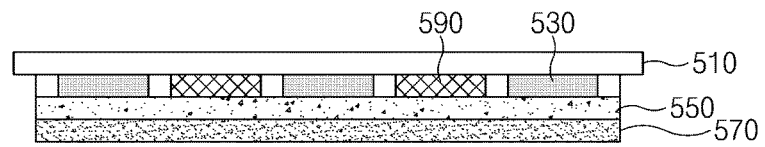
FIG. 5B is a cross sectional view illustrating an example electronic device in which a touch panel and an antenna are formed in the same layer, according to an example embodiment.
Figure 5C:
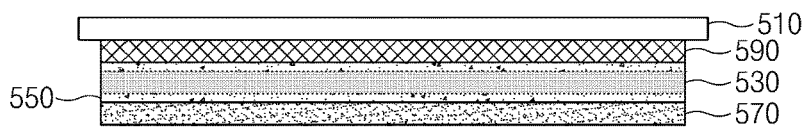
FIG. 5C is a cross sectional view illustrating an example electronic device that includes an antenna that overlaps a display area of a display and a touch panel provided in an in-cell form, according to an example embodiment of the present disclosure.
Figure 5D:
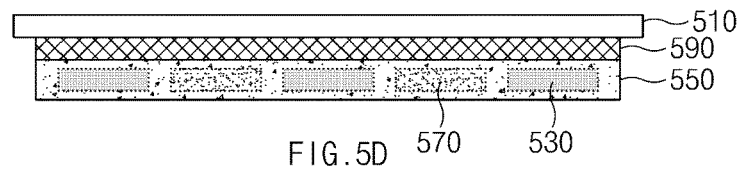
FIG. 5D is a cross sectional view illustrating an example electronic device in which an antenna that overlaps a display area of a display and a touch panel provided in an in-cell form are formed in the same layer, according to an example embodiment of the present disclosure.
Figure 5E:
FIG. 5E is a cross sectional view illustrating an example electronic device in which an antenna is provided in a display panel in an in-cell form, according to an example embodiment.
Figure 5F:
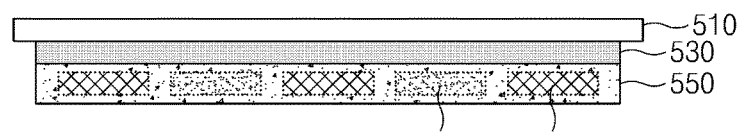
FIG. 5F is a cross sectional view illustrating an example electronic device in which an antenna and a pressure sensor are formed in the same layer of a display panel in an in-cell form, according to an example embodiment of the present disclosure.

FIG. 5A is a cross sectional view illustrating an example electronic device that includes an antenna that overlaps a display area of a display according to an example embodiment of the present disclosure. FIG. 5B is a cross sectional view illustrating an example electronic device in which a touch panel and an antenna are formed in the same layer, according to an example embodiment of the present disclosure. FIG. 5C is a cross sectional view illustrating an example electronic device that includes an antenna that overlaps a display area of a display and a touch panel provided in an in-cell form, according to an example embodiment of the present disclosure. FIG. 5D is a cross sectional view illustrating an example electronic device in which an antenna that overlaps a display area of a display and a touch panel provided in an in-cell form are formed in the same layer, according to an example embodiment of the present disclosure. FIG. 5E is a cross sectional view illustrating an example electronic device in which an antenna is provided in a display panel in an in-cell form, according to an example embodiment of the present disclosure. FIG. 5F is a cross sectional view illustrating an example electronic device in which an antenna and a pressure sensor are formed in the same layer of a display panel in an in-cell form, according to an example embodiment of the present disclosure.

Referring to FIG. 5A to 5F, the antenna 590 may overlap a display area of the display (e.g., the display 110). According to an embodiment, the antenna 590 may be arranged on or over the display panel 550. According to various embodiments, the antenna 590, the touch panel 530, the display panel 550, and the pressure sensor 570 may be sequentially stacked under the front cover 510. However, the present disclosure is not limited thereto. In some embodiments, the pressure sensor 570 may be excluded.

Referring to FIG. 5B, the antenna 590 may be formed in the same layer as the touch panel 530. According to an embodiment, the touch panel 530 may be located on the display panel 550, and a conductive member that may be utilized as the antenna 590 may be provided between the electrodes formed in the touch panel 530 or at a location that is adjacent to the electrodes. The conductive member, for example, may include a conductive pattern to be utilized as a radiator of the antenna 590, and may be electrically connected with anther antenna to provide a ground area. In some embodiments, some of the electrodes formed in the touch panel 530 may be utilized as radiators of the antenna 590, or may provide ground areas. In this case, the some electrodes may not be connected with a touch control circuit and may be connected with a wireless communication circuit or a ground member.

Referring to FIG. 5C, the antenna 590 may be arranged on the display panel 550 in which the touch panel 530 is formed in an in-cell form. For example, an insulation layer may be arranged on the display panel 550, and a conductive member that may be utilized as the antenna 590 may be arranged in the insulation layer.

Referring to FIG. 5D, the antenna 590 may be arranged on the display panel 550 in which the touch panel 530 and the pressure sensor 570 are formed in an in-cell form.

Referring to FIG. 5E, the antenna 590 may be formed in the display panel 550 in an in-cell form. For example, the display panel 550 in which the antenna 590 is formed in an in-cell form may be arranged under the touch panel 530, and the pressure sensor 570 may be arranged under the display panel 550. According to an embodiment, a conductive member that may be utilized as the antenna 590 may be arranged in a thin film transistor substrate of the display panel 550.

Referring to FIG. 5F, the antenna 590 may be formed in the display panel 550 in an in-cell form together with the pressure sensor 570. According to an embodiment, the display panel 550 in which the antenna 590 and the pressure sensor 570 are formed in an in-cell form may be arranged under the touch panel 530.

According to various embodiments, a portion of the display may be curved. According to an embodiment, at least a portion of a peripheral area of the display may be curved. When a portion of the display is curved, an area of at least one of the front cover 510, the antenna 590 stacked under the front cover 510, the touch panel 530, the display panel 550, or the pressure sensor 570 may be curved.

Figure 6A:
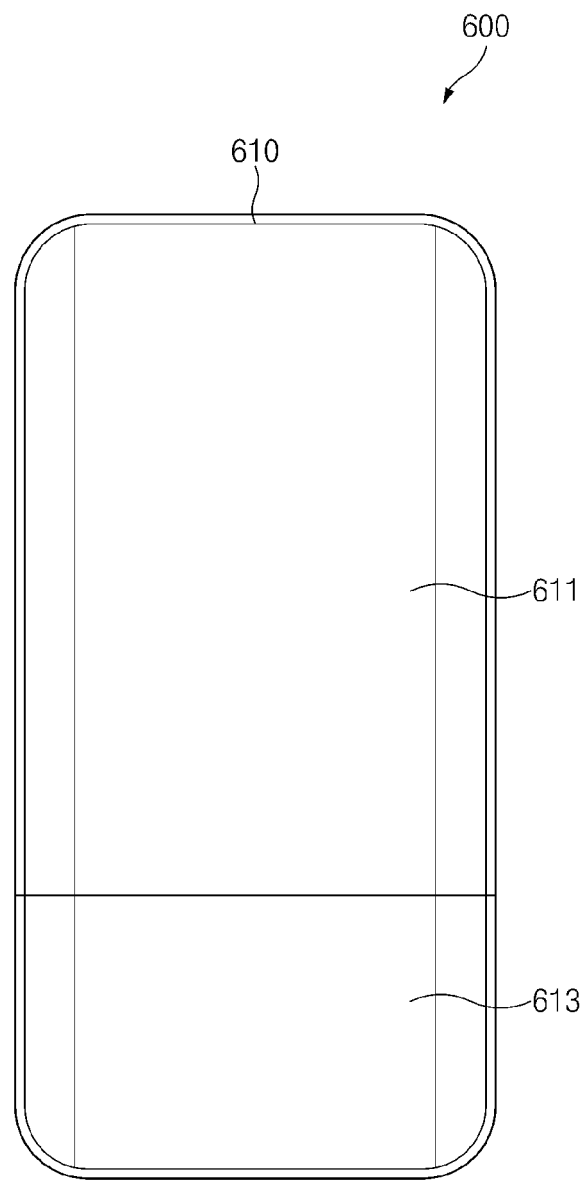
FIG. 6A is a diagram illustrating an example electronic device in which a display area of a display is logically classified, according to an example embodiment of the present disclosure.
Figure 6B:
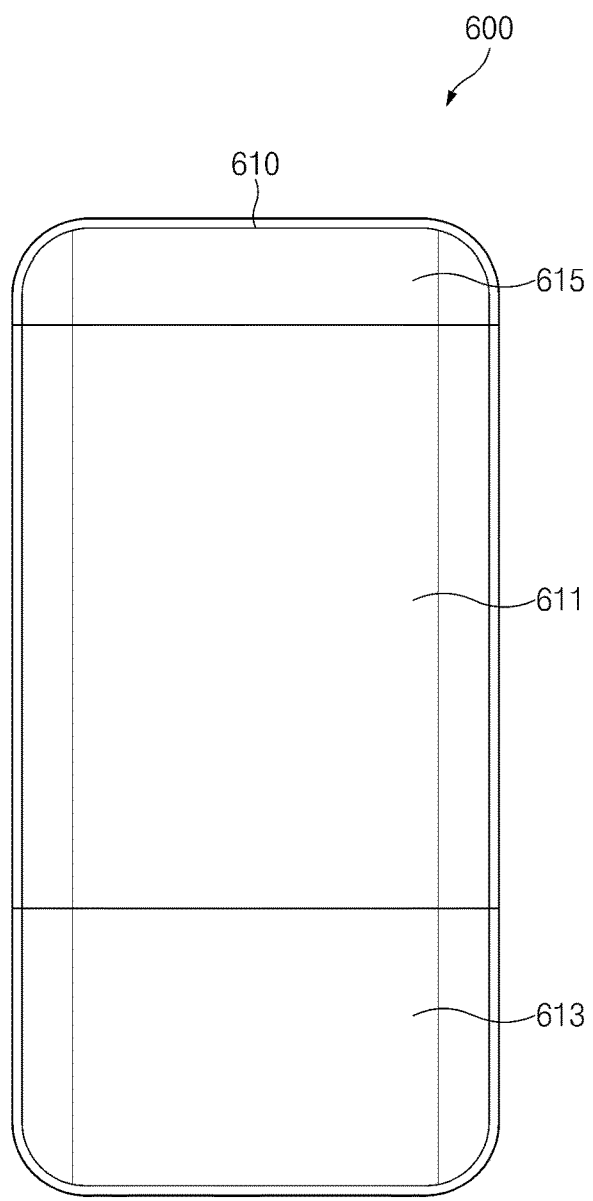
FIG. 6B is a diagram illustrating an example electronic device in which a display area of a display is logically classified in another form, according to an example embodiment of the present disclosure.

FIG. 6A is a diagram illustrating an example electronic device in which a display area of a display is logically classified, according to an example embodiment of the present disclosure. FIG. 6B is a diagram illustrating an example electronic device in which a display area of a display is logically classified in another form, according to an example embodiment of the present disclosure.

Referring to FIGS. 6A and 6B, the whole surface of the display 610 of the electronic device 600 may be displayed as an execution screen of one active application (e.g., an application that occupies a foreground of a screen), or may be divided into a plurality of areas to be displayed as an execution screen of at least one application. According to an embodiment, the display 610 may be divided into a main display area 611 and a first sub-display area 613. According to another embodiment, the display 610 may be divided into a main display area 611, a first sub-display area 613, and a second sub-display area 615. According to various embodiments, the main display area 611 is a central area of the display 610 and a ratio of a longitudinal length to a transverse length may be 16:9, and the first sub-display area 613 may define a lower end area of the display 610 and the second sub-display area 615 may define an upper end area of the display 610. However, the present disclosure is not limited thereto. The ratios of the areas may be selectively changed, at least one of the first sub-display area 613 or the second sub-display area 615 may be omitted, and at least one other sub-display area (e.g., a third sub-display area (not illustrated)) may be added.

According to various embodiments, the electronic device 600 may output an execution screen of an application in the main display area 611, and may display additional functions of the electronic device 600, for example, a time display function, a battery power display function, or a soft key (e.g., a home button) implemented in a software way in the first sub-display area 613 or the second sub-display area 615.

Figure 7:
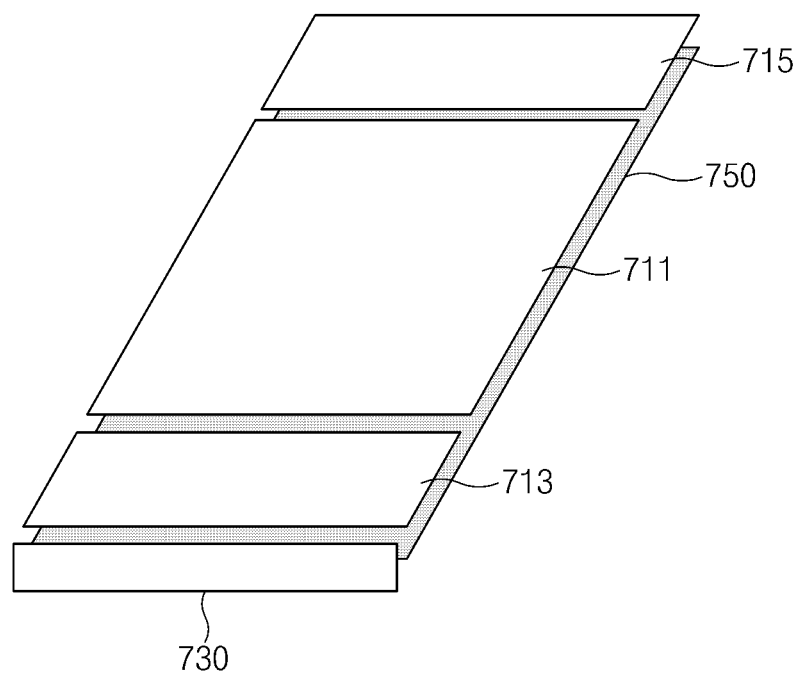
FIG. 7 is an exploded perspective view of a part of an example electronic device according to an example embodiment of the present disclosure.

FIG. 7 is an exploded perspective view illustrating a part of an example electronic device according to an example embodiment of the present disclosure.

Referring to FIG. 7, in the electronic device (e.g., the electronic device 100), a sub-antenna may be formed by utilizing an area of a touch panel 711 arranged on a display area of a display 750, or a sub-antenna may be formed in an area (e.g., on the same plane as the touch panel) that is adjacent to the touch panel 711. According to an embodiment, a first conductive member 713 and a second conductive member 715 may be arranged on the same plane as the touch panel 711 arranged in a central area of the display 750. The drawing illustrates a state in which the first conductive member 713 is arranged adjacent to a lower end of the touch panel 711 and the second conducive member 715 may be arranged adjacent to an upper end of the touch panel 711. According to various embodiments, the touch panel 711 is a transparent electrode (e.g., an ITO electrode) that is utilized as a touch sensing part, and may have a Tx electrode and an Rx electrode. The touch sensing part may include conductive islands (e.g., the Tx electrode and the Rx electrode) that are not electrically connected with a conductive pattern that is formed in the conductive member (e.g., the first conductive member 713 or the second conductive member 715). According to an embodiment, the conductive islands may be formed in a repeated pattern. According to various embodiments, at least one of the first conductive member 713 or the second conductive member 715 may include a transparent electrode that is utilized as the touch sensing part.

According to various embodiments, at least one of the first conductive member 713 or the second conductive member 715 may be utilized as a sub-antenna. According to an embodiment, the first conductive member 713 may be connected with a main antenna 730 arranged on a lower end side surface of the electronic device, and may secure a performance of the main antenna 730. For example, the first conductive member 713 includes a conductive pattern that may be utilized as an antenna radiator, and a resonance frequency of the main antenna 730 may be adjusted as the conductive pattern is connected with the main antenna 730 such that an electrical length of the main antenna 730 may be changed. Alternatively, the first conductive member 713 may be electrically connected with the main antenna 730 to provide a ground area. According to various embodiments, a portion of the first conductive member 713 may be utilized as an antenna, and a portion of the first conductive member 713 may be utilized as a touch sensing part. For example, a portion of the first conductive member 713 may be connected with the main antenna 730 to supplement a performance of the main antenna 730, and a portion of the first conductive member 713 may be connected with the touch panel 711 to be utilized as a touch sensing part. According to various embodiments, the second conductive member 715 may be connected with the touch panel 711 to be utilized as a touch sensing part, and in some embodiments, at least a portion of the second conductive member 715 may be utilized as a sub-antenna.

According to various embodiments, the touch sensing part formed in the first conductive member 713 or the second conductive member 715 may have a density that is lower than the density of the touch sensing part formed in the touch panel 711. For example, a repeated pattern of the conductive islands (e.g., the Tx electrode and the Rx electrode) formed in the first conductive member 713 or the second conductive member 715 may have a density that is lower than the density of a repeated pattern of the conductive islands (e.g., the Tx electrode and the Rx electrode) formed in the touch panel 711. Accordingly, a conductive pattern that may be utilized as an antenna radiator may be formed between repeated patterns of the conductive islands formed in the first conductive member 713 or the second conductive member 715.

The drawing illustrates a form in which the touch panel 711, and the first conductive member 713 and the second conductive member 715 are separated from each other, but the present disclosure is not limited thereto. According to various embodiments, at least one of the first conductive member 713 or the second conductive member 715 may be included in the touch panel 711. For example, the touch panel 711 may extend towards the upper or lower direction. In this case, an area of the touch panel 711 that is adjacent to the main antenna 730 may be connected with the main antenna 730 to supplement the performance of the main antenna 730.

Figure 8A:
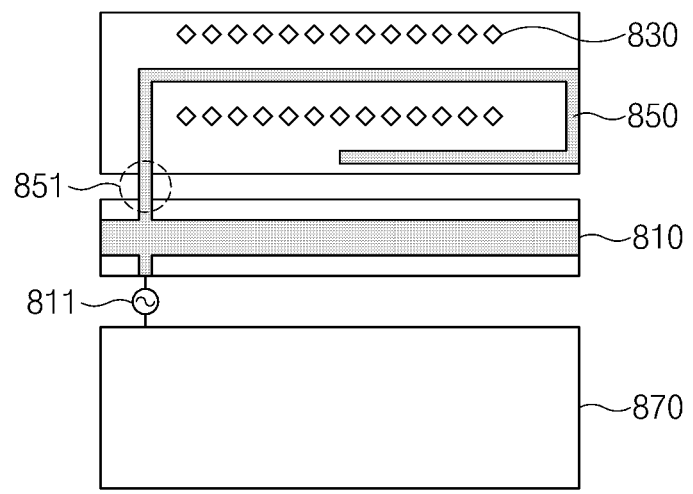
FIG. 8A is a diagram illustrating an example sub-antenna that is connected with a main antenna, according to an example embodiment of the present disclosure.
Figure 8B:
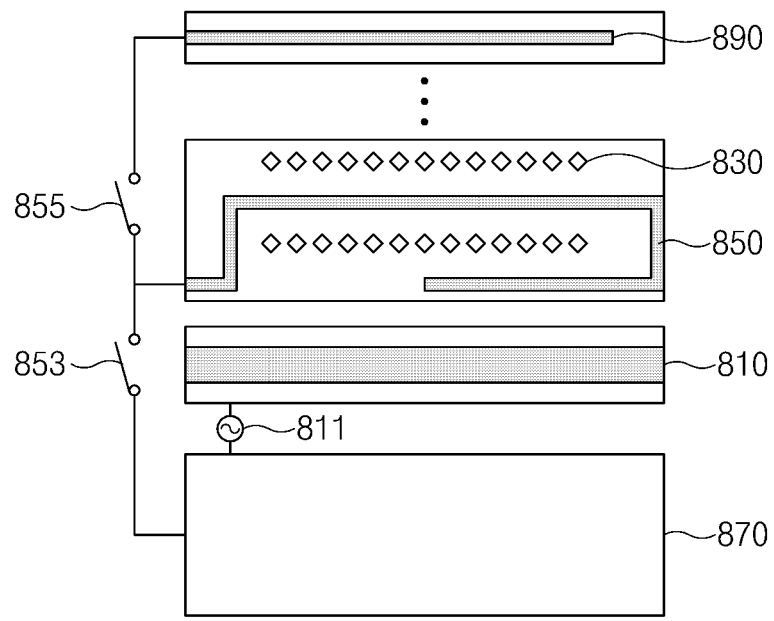
FIG. 8B is a diagram illustrating an example sub-antenna that is connected with a switch, according to an example embodiment of the present disclosure.
Figure 8C:
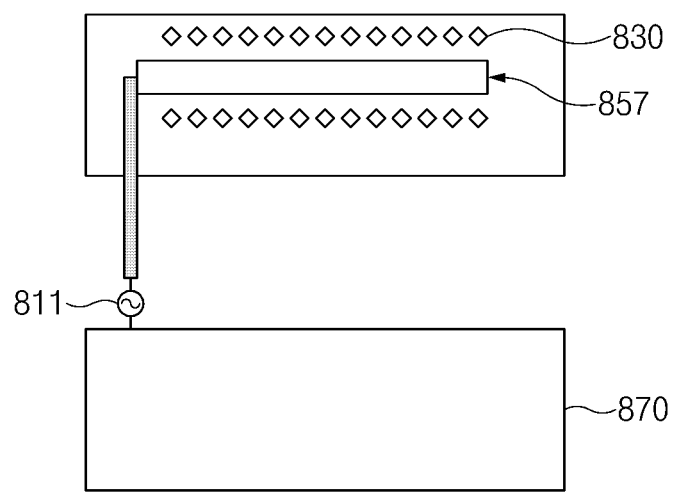
FIG. 8C is a diagram illustrating an example slot antenna according to an example embodiment of the present disclosure.

FIG. 8A is a diagram illustrating an example sub-antenna that is connected with a main antenna, according to an example embodiment of the present disclosure. FIG. 8B is a diagram illustrating an example sub-antenna that is connected with a switch, according to an example embodiment of the present disclosure. FIG. 8C is a diagram illustrating an example slot antenna according to an example embodiment of the present disclosure.

Referring to FIGS. 8A to 8C, an electronic device (e.g., the electronic device 100) may include a main antenna 810. According to an embodiment, the main antenna 810 may be formed by utilizing at least a portion (e.g., a metal part of the housing) of a housing (e.g., the housing 170) of the electronic device. The main antenna 810 may be connected with a ground member 870 and a feeder 811. The feeder 811 may supply electric power to the main antenna 810, and the ground member 870 may provide a ground area. According to an embodiment, the ground member 870 may be included in a printed circuit board, and in some embodiments, may be included in a heat dissipating member (or a metal member) of a display.

According to various embodiments, a sub-antenna 850 may be formed in at least an area of a touch panel. According to an embodiment, a sub-antenna 850 may be formed between touch sensing parts 830 or adjacent to the touch sensing parts 830. The drawing illustrates a state in which a portion of the sub-antenna 850 is formed between the electrode patterns (e.g., a repeated pattern of conductive islands) of the touch panel.

Referring to FIG. 8A, the sub-antenna 850 may be connected with the main antenna 810 to supplement the performance of the main antenna 810. For example, the main antenna 810 may be connected with the sub-antenna 850 to change an electrical length of the main antenna 810, and accordingly, a resonance frequency of the main antenna 810 may be adjusted. According to various embodiments, the sub-antenna 850 may be directly connected with the main antenna 810, and may be spaced apart from the main antenna 810 by a specific distance. When the sub-antenna 850 is spaced apart from the main antenna 810 by a specific distance, the sub-antenna 850 and the main antenna 810 are coupled to each other in an adjacent area 851 such that an electrical length of the main antenna 810 may be adjusted.

Referring to FIG. 8B, the sub-antenna 850 may be connected with the ground member and an additional pattern 890 by a first switch 853 and a second switch 855. Based on operations of the first switch 853 and the second switch 855, an operation and a resonance frequency of the sub-antenna 850 as an antenna may be determined.

Referring to FIG. 8C, a slot 857 may be formed between the touch sensing parts 830 of the touch panel or adjacent to the touch sensing part 830. According to an embodiment, a portion of the touch sensing parts 830 of the touch panel may be removed such that the slot 857 is formed. According to various embodiments, as the feeder 811 and the ground member 870 are connected with a portion of the touch panel having the slot 857, a slot antenna may be implemented.

Figure 9A:
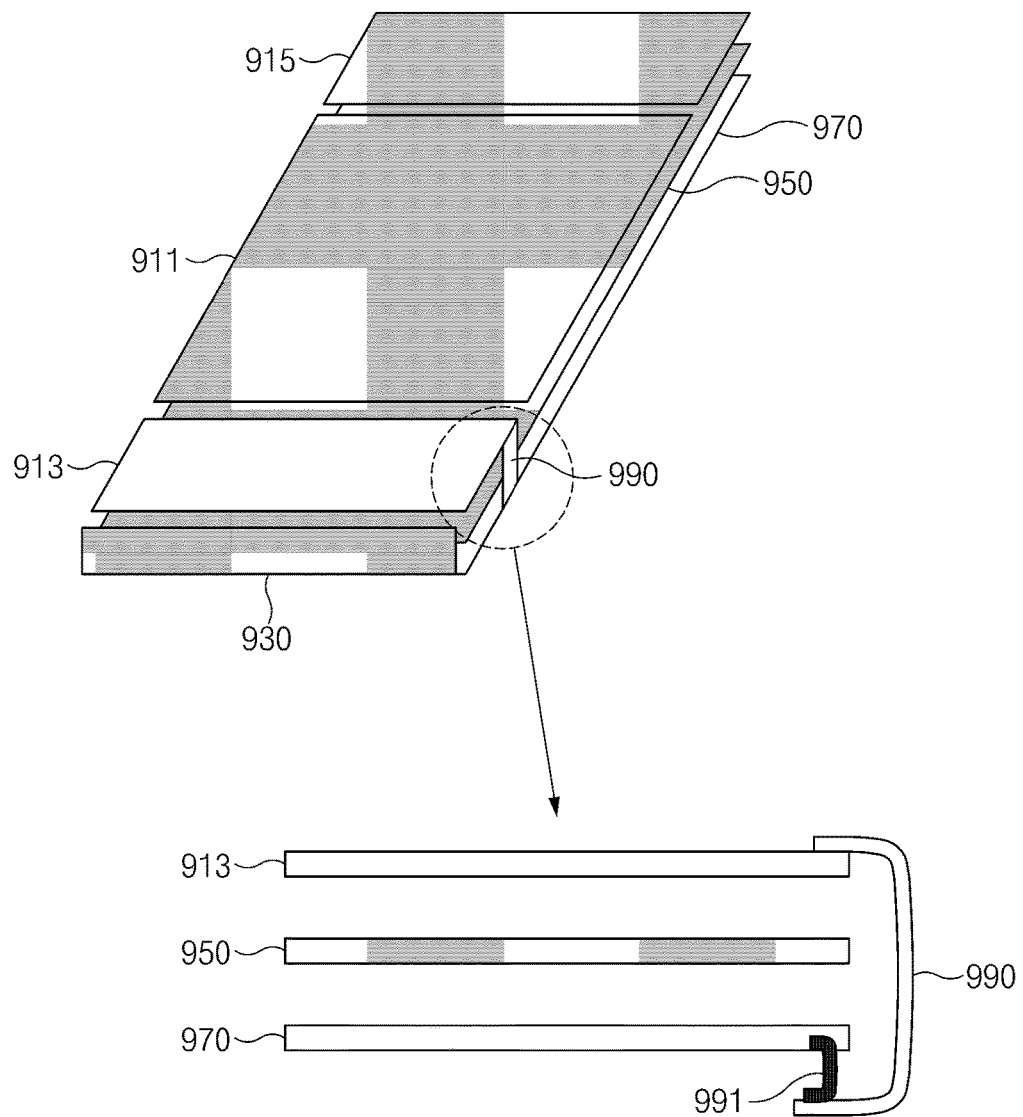
FIG. 9A is a perspective view illustrating a portion of an example electronic device, illustrating a connection structure of a sub-antenna and a ground member, according to an example embodiment of the present disclosure.
Figure 9B:
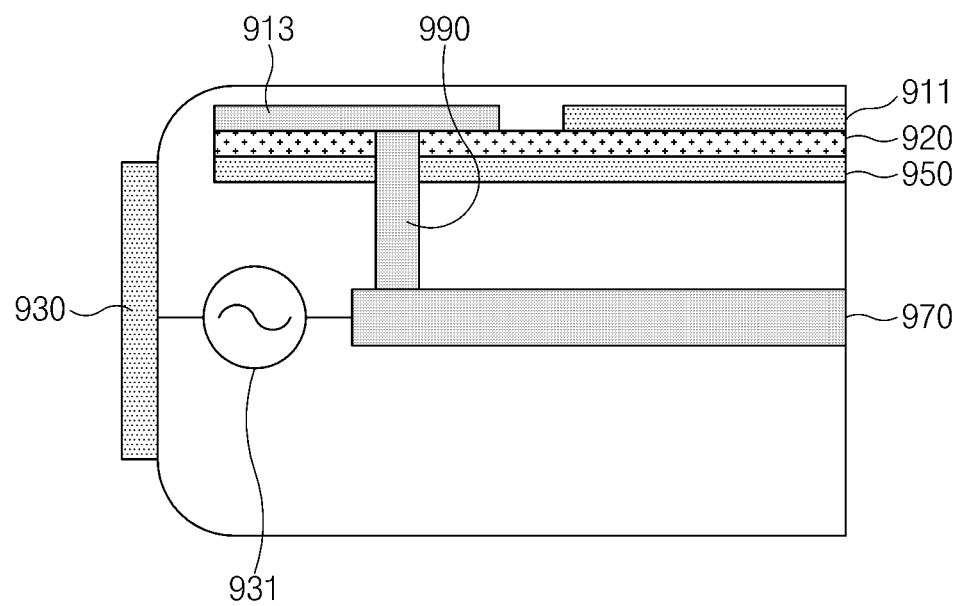
FIG. 9B is a cross sectional view illustrating a portion of an example electronic device, illustrating a connection structure of a sub-antenna and a ground member, according to an example embodiment of the present disclosure.

FIG. 9A is a perspective view illustrating a portion of an example electronic device, illustrating a connection structure of a sub-antenna and a ground member, according to an example embodiment of the present disclosure. FIG. 9B is a cross sectional view illustrating a portion of an example electronic device, illustrating a connection structure of a sub-antenna and a ground member, according to an example embodiment of the present disclosure.

Referring to FIGS. 9A and 9B, an electronic device (e.g., the electronic device 100) may include a touch panel 911, a first conductive member 913, a second conductive member 915, a display panel 920, a main antenna 930, a metal cover 950, and a printed circuit board 970. According to an embodiment, the touch panel 911, the first conductive member 913, and the second conductive member 915 may be arranged on the same layer. According to various embodiments, at least one of the first conductive member 913 or the second conductive member 915 may be excluded. In this case, the touch panel 911 may extend towards the upper or lower direction. As illustrated in FIG. 9B, the main antenna 930 may be connected with a feeder 931 and a ground member 970.

According to various embodiments, at least one of the first conductive member 913 or the second conductive member 915 may be utilized as a sub-antenna. According to an embodiment, at least one of the first conductive member 913 or the second conductive member 915 may be connected with a main antenna 930 to secure a performance of the main antenna 930.

According to various embodiments, at least one of the first conductive member 913 or the second conductive member 915 may be connected with a printed circuit board 970 that provides a ground area. The drawing illustrates a state in which the first conductive member 913 is connected with the printed circuit board 970 through a connector 990. According to an embodiment, as illustrated in FIG. 9A, the connector 990 may be formed of a flexible material, and a portion of the connector 990 may be bent when the first conductive member 913 and the printed circuit board 970 are connected with each other. In this case, the connector 990 may not contact the metal cover 950 that is arranged in the form of a floating metal. For example, an upper end of the connector 990 may be connected with a front surface of the first conductive member 913 and a portion of the connector 990, which is adjacent to the connected part, may be bent in a direction in which the printed circuit board 970 is positioned. Further, a lower end of the connector 990 may be connected with a rear surface of the printed circuit board 970, and a portion of the connector 990, which is adjacent to the connected part, may be bent in a direction in which the first conductive member 913 is positioned. However, the shape of the connector 990, and a location where the connector 990 is connected with the first conductive member 913 and the printed circuit board 970 are not limited thereto. According to another embodiment, as illustrated in FIG. 9B, an upper end of the connector 990 may be connected with a rear surface of the first conductive member 913 and a lower end of the connector 990 may be connected with a front surface of the printed circuit board 970. According to an embodiment, the connector 990 may include a flexible printed circuit board or a conductive tape. According to various embodiments, the connector 990 may be fixed to the printed circuit board 970 through a fixing member 991. For example, as illustrated in FIG. 9A, a lower end of the connector 990 may be fixed to the printed circuit board 970 by the fixing member 991. According to an embodiment, the fixing member 991 may include a C-clip.

Figure 10:
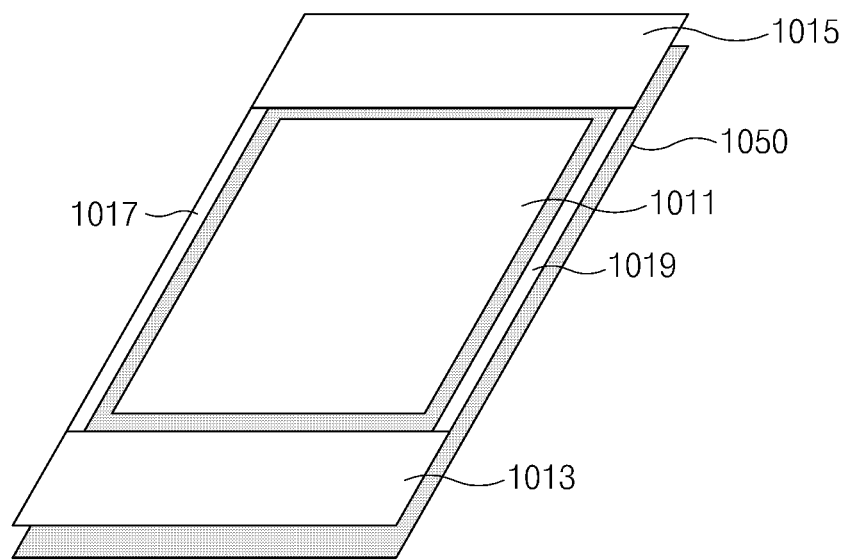
FIG. 10 is an exploded perspective view illustrating a part of an example electronic device in another form according to an example embodiment of the present disclosure.

FIG. 10 is an exploded perspective view illustrating a part of an example electronic device in another form according to an example embodiment of the present disclosure.

Referring to FIG. 10, an electronic device (e.g., the electronic device 100) may include a touch panel 1011, a first conductive member 1013, a second conductive member 1015, a third conductive member 1017, a fourth conductive member 1019, and a display 1050. According to various embodiments, the touch panel 1011 may be arranged in a central area of the display 1050, and the first conductive member 1013, the second conductive member 1015, the third conductive member 1017, and the fourth conductive member 1019 may be arranged on the same plate as the touch panel 1011. The drawing illustrates a state in which the first conductive member 1013 is arranged adjacent to a lower end of the touch panel 1011, the second conductive member 1015 is arranged adjacent to an upper end of the touch panel 1011, and the third conductive member 1017 and the fourth conductive member 1019 are arranged adjacent to left and right peripheries of the touch panel 1011, respectively. According to various embodiments, the first conductive member 1013, the second conductive member 1015, the third conductive member 1017, and the fourth conductive member 1019 may be arranged in peripheral areas of the display 1050, respectively.

According to various embodiments, at least one of the first conductive member 1013, the second conductive member 1015, the third conductive member 1017, and/or the fourth conductive member 1019 may be integrally formed with the touch panel 1011. According to various embodiments, at least one of the first conductive member 1013, the second conductive member 1015, the third conductive member 1017, and the fourth conductive member 1019 may have a Tx electrode and an Rx electrode to function as a touch sensing part.

According to various embodiments, the touch panel 1011 may be arranged in an effective display area of the display 1050. The effective display area may be an area, in which a ratio of a longitudinal length and a transverse length of the display 1050 is a specific value (e.g., 16:9). According to various embodiments, when at least one of the first conductive member 1013, the second conductive member 1015, the third conductive member 1017, and the fourth conductive member 1019 functions as a touch sensing part, the corresponding area may be an area (e.g., a touch rejection area), of which a touch sensitivity is a specific value or less. For example, because an unintended touch may occur due to a grip of a user in an area that is close to a periphery of the electronic device, the touch sensitivity of the corresponding area may be set to a specific value or less.

According to various embodiments, at least one of the first conductive member 1013, the second conductive member 1015, the third conductive member 1017, and/or the fourth conductive member 1019 may function as an antenna. According to various embodiments, at least one of the first conductive member 1013, the second conductive member 1015, the third conductive member 1017, and/or the fourth conductive member 1019 may be connected with each other or independently function as an antenna.

Figure 11:
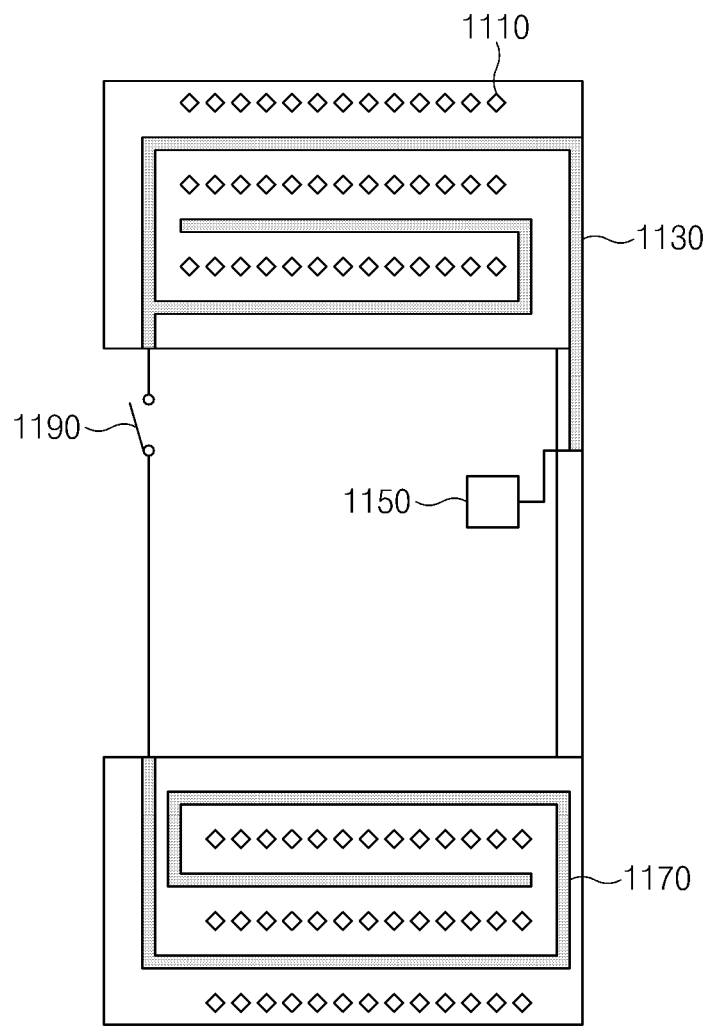
FIG. 11 is a diagram illustrating an example connection structure of an antenna that utilizes a switch, according to an example embodiment of the present disclosure.

FIG. 11 is a diagram illustrating an example connection structure of an antenna that utilizes a switch, according to an example embodiment of the present disclosure.

Referring to FIG. 11, in an electronic device (e.g., the electronic device 100), a portion of a touch panel (e.g., the touch panel 1011) or a conductive member (e.g., the first conductive member 1013, the second conductive member 1015, the third conductive member 1017, or the fourth conductive member 1019) arranged in the same layer as the touch panel may be utilized as an antenna. According to various embodiments, the electronic device may include a plurality of antennas that are spaced apart from each other by a specific distance. According to an embodiment, in the electronic device, a conductive member that is arranged in an upper end area of the touch panel or adjacent to an upper end of the touch panel may be utilized as a first antenna 1130, and a conductive member that is arranged in a lower end area of the touch panel or adjacent to a lower end of the touch panel may be utilized as a second antenna 1170. According to various embodiments, the first antenna 1130 and the second antenna 1170 may be formed between touch sensing parts 1110 formed in the touch panel or adjacent to the touch sensing parts 1110. The drawing illustrates a state in which a portion of radiators of the first antenna 1130 and the second antenna 1170 are formed between electrode patterns (e.g., repeated patterns of conductive islands) of the touch panel. According to various embodiments, the first antenna 1130 or the second antenna 1170 may be connected with a communication control circuit 1150 (e.g., an NFC IC).

According to various embodiments, the first antenna 1130 and the second antenna 1170 may independently perform the functions thereof, or may be connected with each other through a switch 1190 to form a resonance frequency that is different from the frequency band of the first antenna 1130 and the frequency band of the second antenna 1170. According to an embodiment, the first antenna 1130 and the second antenna 1170 may independently perform the functions thereof in a state in which the switch 1190 is opened, and may function as a third antenna in a state in which the switch 1190 is closed.

According to an embodiment, the first antenna 1130 may be operated as a near field communication (NFC) antenna in a state in which the switch 1190 is opened. As another embodiment, if the switch 1190 is closed, the first antenna 1130 and the second antenna 1170 may be electrically connected with each other to be operated as a magnetic stripe transmission (MST) antenna.

Figure 12A:
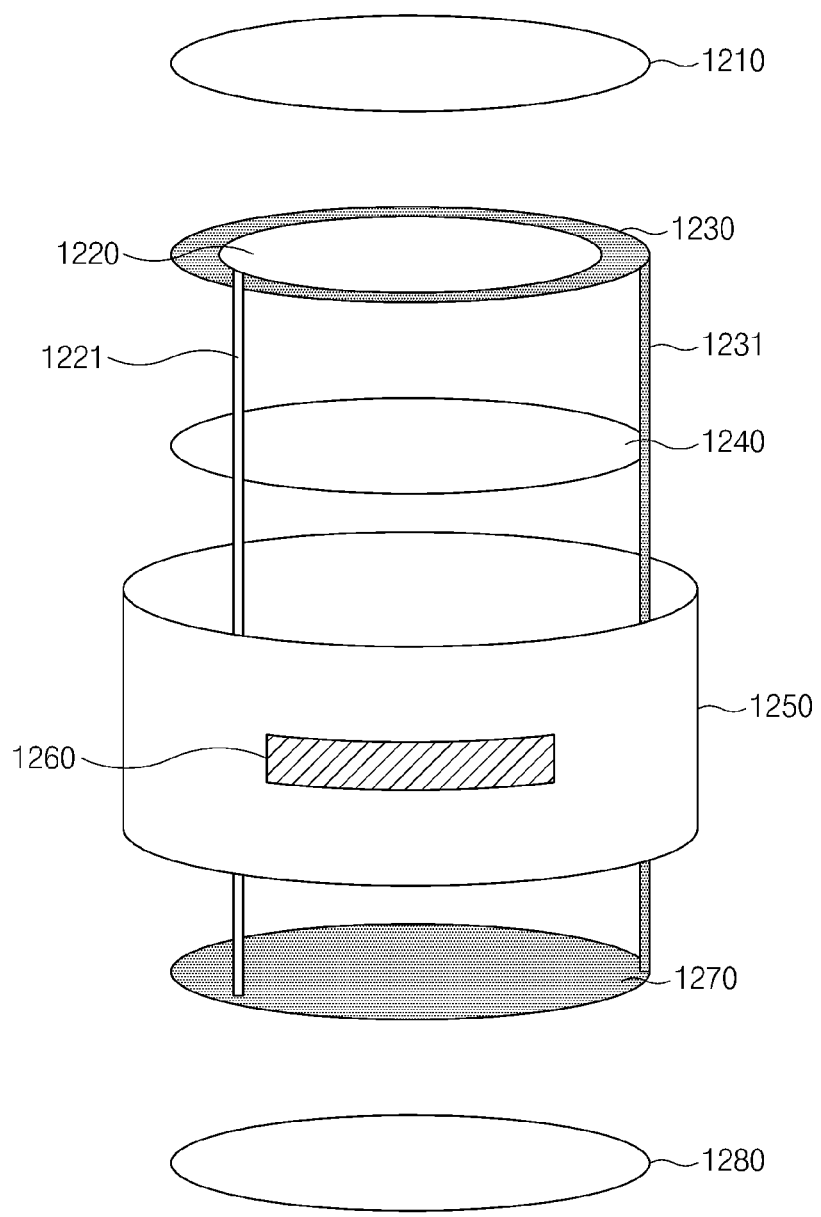
FIG. 12A is an exploded perspective view illustrating an example electronic device having a circular display according to an example embodiment of the present disclosure.
Figure 12B:
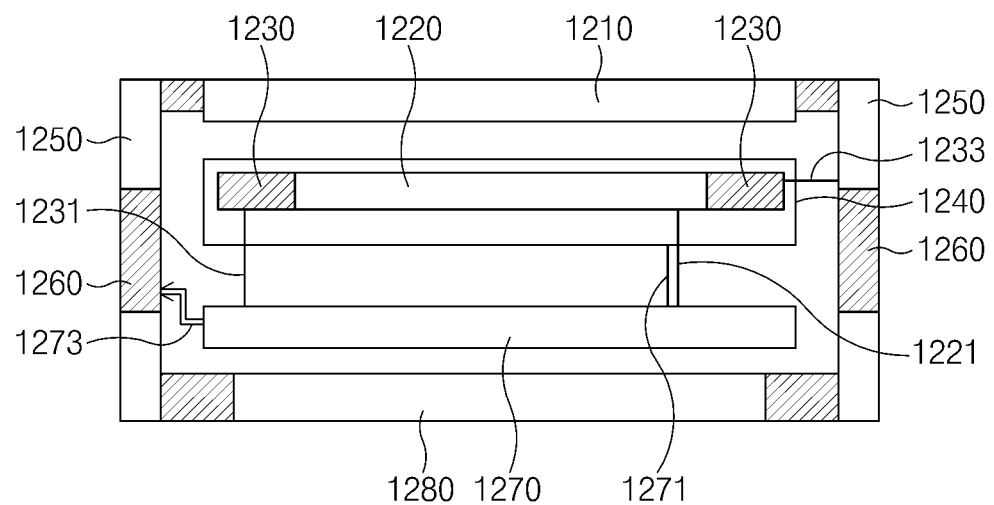
FIG. 12B is a cross sectional view illustrating an example electronic device having a circular display according to an example embodiment of the present disclosure.

FIG. 12A is an exploded perspective view illustrating an example electronic device having a circular display according to an example embodiment of the present disclosure. FIG. 12B is a cross sectional view illustrating an example electronic device having a circular display according to an example embodiment of the present disclosure.

Referring to FIG. 12A, an electronic device (e.g., the electronic device 100) may include a front cover 1210, a conductive member 1220, a ground member 1230, a display 1240, a housing 1250, a printed circuit board 1270, and a rear cover 1280. According to various embodiments, surfaces of the above-described elements may be circular or elliptical as a whole. According to an embodiment, an electronic device may include a smart watch. In the following description, the elements that are the same as or similar to those of the electronic device 100 of FIG. 1 will be omitted.

According to various embodiments, the electronic device may have a conductive member 1220 under the front cover 1210. According to an embodiment, a portion of the conductive member 1220 may be utilized as a touch sensing part and a portion of the conductive member 1220 may be utilized as an antenna. According to various embodiments, a ground member 1230 may be arranged in a peripheral area of the conductive member 1220.

According to various embodiments, the conductive member 1220 may be connected with the printed circuit board 1270 through a conductive line 1221. According to an embodiment, the conductive line 1221 may be a touch signal line that is connected with the touch sensing part formed at a portion of the conductive member 1220 and a touch control circuit included in the printed circuit board 1270. According to various embodiments, the ground member 1230 may be connected with a ground area of the printed circuit board 1270 through a first ground connector 1231. In this case, the first ground connector 1231 may detour a main antenna 1260 formed in an area of the housing 1250.

According to various embodiments, the housing 1250 may include a conductive material (e.g., a metal), and the conductive material may be utilized as a radiator of the main antenna 1260. According to an embodiment, the conductive material may be spaced apart from the conductive member 1220 by a specific distance or more through the ground member 1230. According to various embodiments, the ground member 1230 may include an insulation material (e.g., glass). In some embodiments, the ground member 1230 includes a plastic material, and in this case, may be formed in the housing 1250 through injection-molding.

Referring to FIG. 12B, in various embodiments, a conductive member 1220 in which the ground member 1230 is arranged in a peripheral area thereof may be arranged in the interior of the display 1240. The conductive member 1220 may be connected with the printed circuit board 1270 through the conductive line 1221, and the ground member 1230 may be connected with a ground area of the printed circuit board 1270 through the first ground connector 1231. In an embodiment, the ground member 1230 may be connected with the housing 1250 through the second ground connector 1233. Although not illustrated, in various embodiments, the conductive member 1220 may be connected with the main antenna 1260.

According to an embodiment, the display 1240 may be connected with the printed circuit board 1270 through a display driving signal line 1271. The display 1240 may receive a signal related to output of an image from a processor mounted on the printed circuit board 1270, through the display driving signal line 1271.

According to an embodiment, the antenna 1260 arranged at at least a portion of the housing be connected with the printed circuit board 1270 through a communication signal line 1273. The main antenna 1260 may receive a communication signal (e.g., an RF signal) from a communication module mounted on the printed circuit board 1270 through the communication signal line 1273.

Figure 13A:
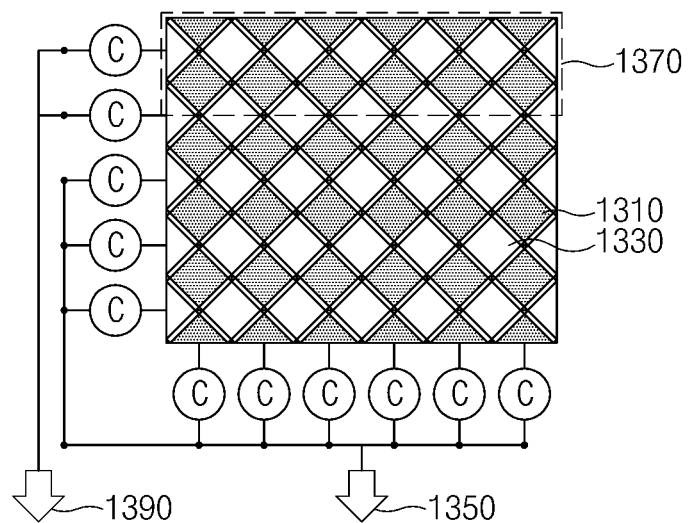
FIG. 13A is a diagram illustrating an example antenna that utilizes a portion of a touch panel according to an example embodiment of the present disclosure.
Figure 13B:
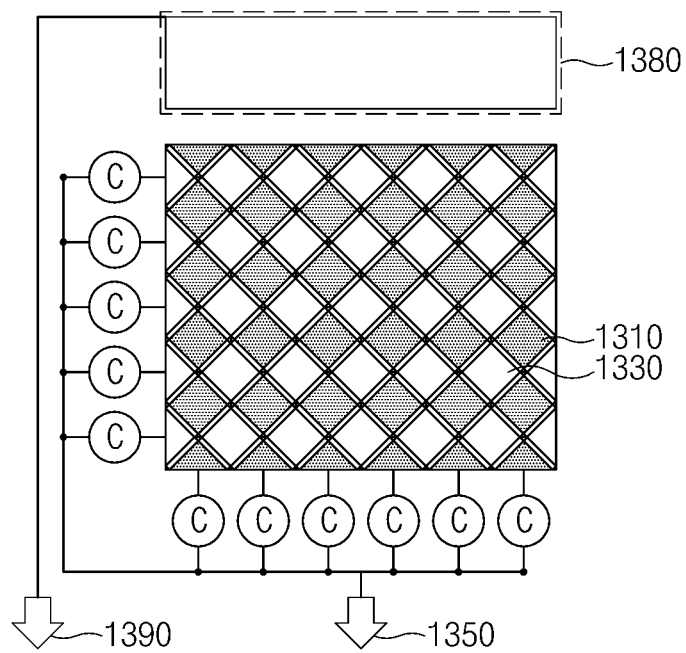
FIG. 13B is a diagram illustrating an example antenna that is separated from a touch panel, according to an example embodiment of the present disclosure.
Figure 13C:
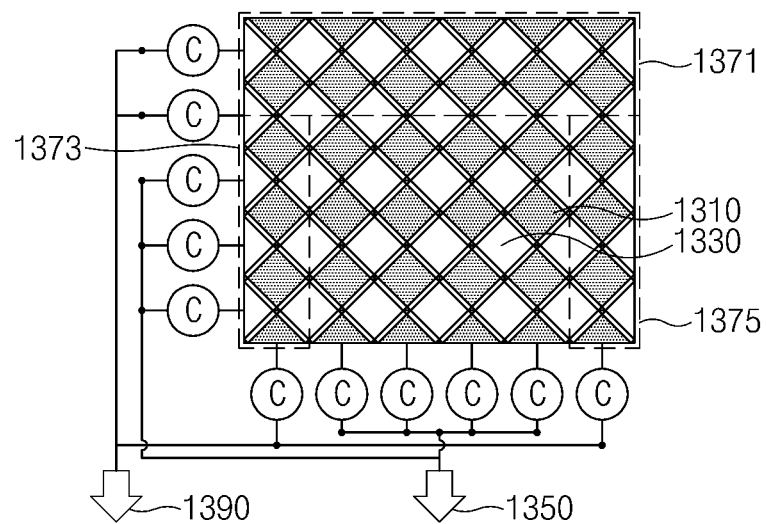
FIG. 13C is a diagram illustrating an example antenna that utilizes a portion of a touch panel in another form, according to an example embodiment of the present disclosure.
Figure 13D:
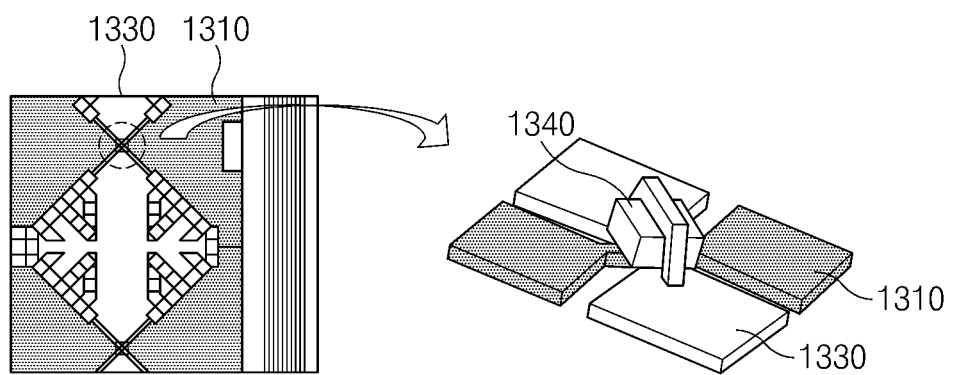
FIG. 13D is a diagram illustrating an example method of processing a wiring line in an area of an antenna that overlaps an electrode of a touch panel according to an example embodiment of the present disclosure.

FIG. 13A is a diagram illustrating an example antenna that utilizes a portion of a touch panel according to an example embodiment of the present disclosure. FIG. 13B is a diagram illustrating an example antenna that is separated from a touch panel, according to an example embodiment of the present disclosure. FIG. 13C is a diagram illustrating an example antenna that utilizes a portion of a touch panel in another form, according to an example embodiment of the present disclosure. FIG. 13D is a diagram illustrating an example method of processing a wiring line in an area of an antenna that overlaps an electrode of a touch panel according to an example embodiment of the present disclosure.

Referring to FIGS. 13A to 13D, in an electronic device (e.g., the electronic device 100), an antenna may be formed by utilizing an area of a touch panel or an antenna may be formed in an area that is adjacent to the touch panel. The touch panel may be arranged such that a plurality of Rx electrodes 1310 and a plurality of Tx electrodes 1330 cross each other. As illustrated in the drawings, the Rx electrode 1310 may be arranged longitudinally and the Tx electrode 1330 may be arranged transversely.

According to various embodiments, a pattern may be formed in one layer of the Rx electrode 1310 and the Tx electrode 1330, and patterns may be formed in two different layers, respectively. In various embodiments, as illustrated in FIG. 13D, the Rx electrode 1310 and the Tx electrode 1330 may be isolated from each other as an insulator 1340 is arranged in an area in which the Rx electrode 1310 and the Tx electrode 1330 cross each other. According to an embodiment, a cross point of the Rx electrode 1310 and the Tx electrode 1330 may define one touch coordinate.

According to various embodiments, as illustrated in FIG. 13A, an area 1370 of the touch panel may be utilized as an antenna. For example, an electrode formed in the area 1370 of the touch panel may be utilized as an antenna radiator or a ground area. In this case, the electrode formed in the area 1370 of the touch panel may be electrically isolated from an electrode formed in another area of the touch panel 1370. The electrode formed in the area 1370 of the touch panel may be connected with a ground area 1390 of the printed circuit board, and an electrode (e.g., the touch sensing part of the touch panel) formed in another area of the touch panel, except for the area 1370 may be connected with the touch control circuit 1350.

According to various embodiments, as illustrated in FIG. 13C, an upper end area 1371, a left area, and a right area 1375 of the touch panel may be utilized as antennas. According to an embodiment, electrodes formed in the upper end area 1371, the left area 1373, and the right area 1375 of the touch panel may be connected with the ground area of the printed circuit board.

According to various embodiments, as illustrated in FIG. 13B, in the electronic device, an antenna may be formed by utilizing a conductive member arranged in the area 1380 that is adjacent to the touch panel. According to an embodiment, the conductive member may be connected with the ground area 1390 of the printed circuit board. According to various embodiments, an electrode formed in an area (e.g., the upper end area 1371, the left area 1373, or the right area 1375) of the touch panel or a conductive member arranged in the area 1380 that is adjacent to the touch panel may be utilized as a ground area of the antenna.

As described above, when an electrode of the touch panel utilized as an antenna is connected with the ground area 1390 of the printed circuit board, an electrical potential may be reduced as a length of connection path decreases as compared with the case in which the electrode of the touch panel is connected with the ground area, to which the touch control circuit 1350 is connected. Further, if the electrode of the touch panel is connected with a ground area through the touch control circuit 1350, noise may occur as a capacitance or an inductance is caused in the corresponding path.

Figure 14:
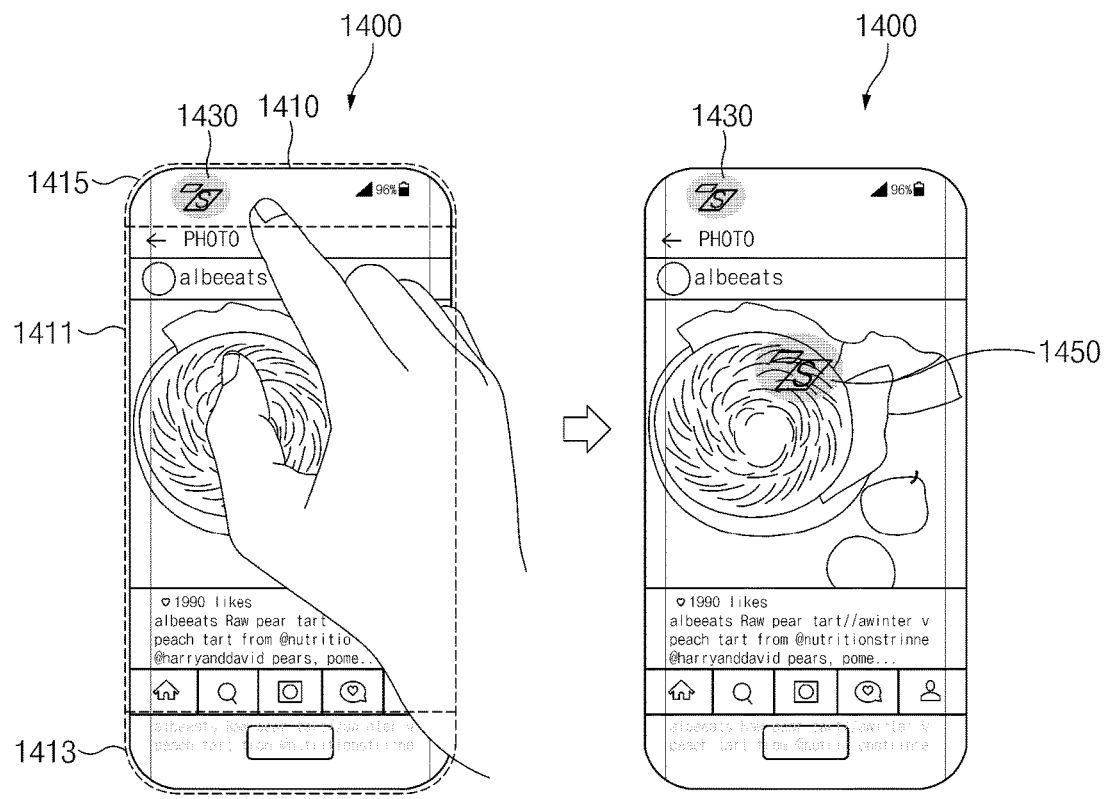
FIG. 14 is a diagram illustrating an example method of processing a touch in an area of a display area of a display, which overlaps an antenna, according to an example embodiment of the present disclosure.

FIG. 14 is a diagram illustrating an example method of processing a touch in an area of a display area of a display, which overlaps an antenna, according to an example embodiment of the present disclosure.

Referring to FIG. 14, the electronic device 1400 may include a display 1410. According to various embodiments, the display area of the display 1410 may be divided into a main display area 1411, a first sub-display area 1413, and a second sub-display area 1415. According to various embodiments, the main display area 1411 is a central area of the display 1410 and a ratio of a longitudinal length to a transverse length may be a specific value (16:9), and the first sub-display area 1413 may define a lower end area of the display 1410 and the second sub-display area 1415 may define an upper end area of the display 1410. However, the present disclosure is not limited thereto. The ratios of the areas may be selectively changed, at least one of the first sub-display area 1413 or the second sub-display area 1415, and at least one other sub-display area (e.g., a third sub-display area (not illustrated) may be added.

According to various embodiments, the antenna may be arranged to overlap the display area of the display 1410. According to an embodiment, the antenna may be formed by utilizing a conductive member that is arranged in an area of the touch panel located on the display panel or a conductive member arranged in an area that is adjacent to the touch panel. According to various embodiments, a first antenna is arranged to overlap a first sub-display area 1413, and a second antenna may be arranged to overlap a second sub-display area 1415. According to an embodiment, the first antenna and the second antenna may receive RF signals of specific frequencies, respectively, or may be connected with a main antenna to function as sub-antennas that supplement the performance of the main antenna.

According to various embodiments, when a conductive pattern utilized as an antenna is formed in an area (e.g., an area that overlaps the first sub-display area 1413 or the second sub-display area 1415) of the touch panel, the density of the patterns of the electrodes that function as touch sensing parts formed in the same area may be lower than the density of the patterns of the electrodes that function as touch sensing parts formed in another area (e.g., an area that overlaps the main display area 1411) due to the arrangement of the conductive pattern. In an area in which the density of patterns of electrodes that function as touch sensing parts, touch sensitivity may be relatively low. Further, in an area in which the density of patterns of electrodes that function as touch sensing parts, touch information (e.g., a touch coordinate, an intensity of a touch, or a touch duration) of a touch input may be relatively inaccurate. According to various embodiments, when a touch input is made in an area in which the density of the patterns of the electrodes that function as touch sensing parts is low, the electronic device 1400 may output information related to the touch input on the main display area 1411 to prevent wrong touch recognition.

According to various embodiments, when a touch input is made in the first sub-display area 1413 or the second sub-display area 1415, the electronic device 1400 may output at least one of the display objects included in the area in which the touch input is made, in the main display area 1411. The drawing illustrates a state in which a touch input is made in the second sub-display area 1415 and the electronic device 1400 outputs the display object 1430 included in the second sub-display area 1415 in the main display area 1411. According to an embodiment, when a display object (e.g., the display object 1430) included in the first sub-display area 1413 or the second sub-display area 1415 in the main display area 1411, the electronic device 1400 may output the display object 1450, which is made larger than the display object by a specific ratio or more or to which an animation effect is applied. According to various embodiments, when a plurality of display objects are included in the first sub-display area 1413 or the second sub-display area 1415, in which a touch input is made, the electronic device 1400 may output a menu popup that includes a plurality of objects as items such that at least one of the plurality of display objects may be selected, in the main display area 1411.

According to various embodiments, when a touch input is made in the first sub-display area 1413 or the second sub-display area 1415, the electronic device 1400 may deactivate an antenna that overlaps the first sub-display area 1413 or the second sub-display area 1415, in which the touch input is made. According to an embodiment, when an antenna is formed in an area (e.g. the first sub-display area 1413 or the second sub-display area 1415) of the touch panel, the electronic device 1400 may alternately operate the touch sensing part and the antenna at a specific time interval. For example, the electronic device 1400 may deactivate the antenna and activate the touch sensing part for a first time period, and may deactivate the touch sensing part and activate the antenna for a second time period. If a touch input is made to the corresponding area while the activation and deactivation of the antenna and the touch sensing part are repeated, the electronic device 1400 may maintain the deactivation of the antenna and the activation of the touch sensing part until a time point when the touch input is ended or a time point after a specific time elapses after the touch input is ended. As the antenna is deactivated while the sensing part is activated to recognize the touch, noise that may be caused by the antenna may decrease so that touch recognition rate may increase.

As described above, according to various embodiments, an electronic device may include a housing that comprises a first surface facing in a first direction, a second surface facing in a second direction opposite from the first direction, and a side surface surrounding a space between the first surface and the second surface, a touch screen display positioned inside the housing and exposed through the first surface, wherein the display comprises a display panel and a touch panel that is separated from or integrated with the display panel, a conductive member (conductor) forming at least a portion of the side surface, at least one substantially transparent conductive pattern that is integrated into the display, a ground member (ground) interposed between the first surface and the second surface, a wireless communication circuit including a port electrically coupled to the conductive member, and a processor electrically coupled to the display and the wireless communication circuit. The substantially transparent conductive pattern may be electrically coupled to the port of the wireless communication circuit and/or the ground member.

According to various embodiments, the touch panel may include a repeated pattern of conductive islands, and the conductive pattern is substantially coplanar with the repeated pattern.

According to various embodiments, the repeated pattern and the conductive pattern may be formed of the same material.

According to various embodiments, the repeated pattern and the conductive pattern may be formed of an ITO electrode.

According to various embodiments, the touch panel may include a first region and a second region when viewed from above the first surface. The first region may include a first repeated pattern of conductive islands. The second region may include a second repeated pattern of conductive islands. The second repeated pattern may be less dense than the first repeated pattern. The conductive pattern may be formed in the second region.

According to various embodiments, the first surface may include a first side having a first length, a second side having a second length longer than the first length, a third side having the first length, and a fourth side having the second length. The first side may be perpendicular to the second side and the fourth side and may be parallel to the third side. The second region may abut the first side, a portion of the second side, and a portion of the fourth side opposite from the portion of the second side.

As described above, according to various embodiments, an electronic device may include a housing that comprises a first surface facing in a first direction, a second surface facing in a second direction that is opposite to the first direction, and a side surface surrounding a portion of a space between the first surface and the second surface, a touch screen display located inside the housing and exposed to the outside through the first surface, wherein the display comprises a display panel and a touch panel that is separated from or integrated with the display panel, a first conductive member forming at least a portion of the side surfaces, at least one other conductive member that is arranged in the interior of the display to be adjacent to the touch panel and comprises a substantially transparent conductive pattern, a ground member that is located between the first surface and the second surface, a wireless communication circuit that comprises a port that is electrically connected with the first conductive member, and a processor that is electrically connected with the display and the wireless communication circuit. The conductive pattern may be electrically connected with the port of the wireless communication circuit and/or the ground member.

According to various embodiments, the at least one other conductive member may be electrically connected with the first conductive member.

According to various embodiments, the at least one other conductive member may have a slot in an area thereof.

According to various embodiments, a second conductive member may be arranged adjacent to a lower end of the touch panel. A third conductive member may be arranged adjacent to an upper end of the touch panel.

According to various embodiments, the second conductive member may be connected with the ground member or the third conductive member through a switch.

According to various embodiments, the second conductive member may be connected with the third conductive member through the switch. At least one of the second conductive member or the third conductive member may function as a first antenna while the switch is opened. The second conductive member and the third conductive member may be electrically connected with each other to function as a second antenna while the switch is closed.

According to various embodiments, at least one of the second conductive member or the third conductive member may be electrically connected with the ground member through a connector formed of a flexible material.

According to various embodiments, the connector may include a flexible printed circuit board or a conductive tape.

According to various embodiments, the connector may be fixed to the ground member through a fixing member.

According to various embodiments, the fixing member may include a C-clip.

According to various embodiments, a second conductive member may be arranged adjacent to an upper end of the touch panel. A third conductive member may be arranged adjacent to a lower end of the touch panel. A fourth conductive member may be arranged adjacent to a left end of the touch panel. A fifth conductive member may be arranged adjacent to a right end of the touch panel.

According to various embodiments, the at least one other conductive member may include a repeated pattern of conductive islands that are electrically isolated from the conductive pattern. The conductive islands may be electrically connected with a touch control circuit to function as a touch sensing unit.

According to various embodiments, a density of the repeated pattern of the conductive islands included in the at least one other conductive member may be lower than a density of the repeated pattern of the electrodes that function as the touch sensing unit included in the touch panel.

According to various embodiments, if a touch input is detected through the repeated pattern of the conductive islands, the processor may be configured to output at least one display object that is output in an area that overlaps the conductive member including the repeated pattern of the conductive islands, in an area of an area that overlaps the touch panel.

Figure 15:
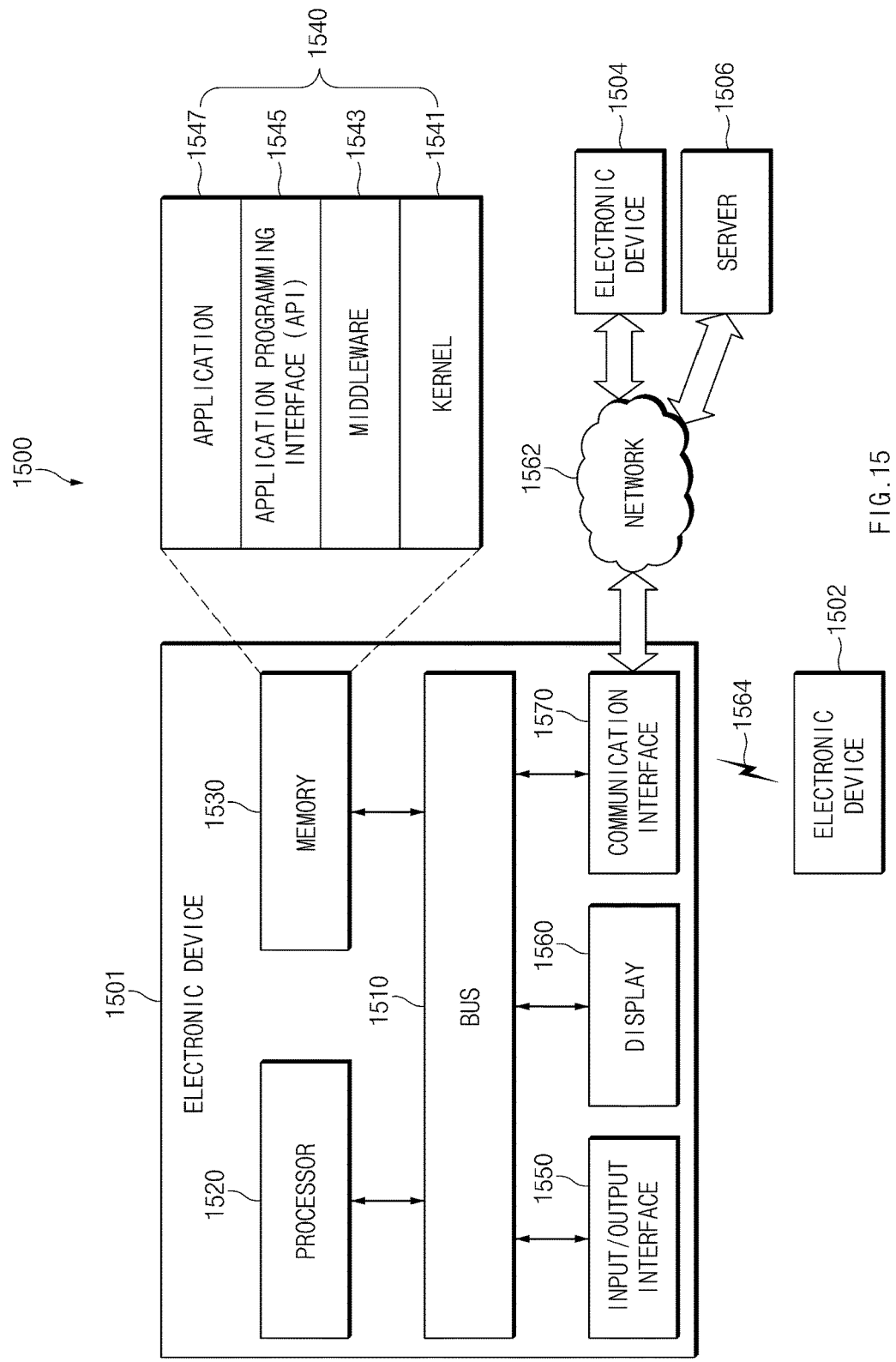
FIG. 15 is a diagram illustrating an example electronic device in a network environment according to an example embodiment of the present disclosure.

FIG. 15 is a diagram illustrating an example electronic device in a network environment according to an example embodiment of the present disclosure.

An electronic device 1501 in a network environment 1500 according to various embodiments of the present disclosure will be described with reference to FIG. 15. The electronic device 1501 may include a bus 1510, a processor (e.g., including processing circuitry) 1520, a memory 1530, an input/output interface (e.g., including input/output circuitry) 1550, a display 1560, and a communication interface (e.g., including communication circuitry) 1570. In various embodiments of the present disclosure, at least one of the foregoing elements may be omitted or another element may be added to the electronic device 1501.

The bus 1510 may include a circuit for connecting the above-mentioned elements 1510 to 1570 to each other and transferring communications (e.g., control messages and/or data) among the above-mentioned elements.

The processor 1520 may include various processing circuitry, such as, for example, and without limitation, at least one of a dedicated processor, a central processing unit (CPU), an application processor (AP), or a communication processor (CP). The processor 1520 may perform data processing or an operation related to communication and/or control of at least one of the other elements of the electronic device 1501.

The memory 1530 may include a volatile memory and/or a nonvolatile memory. The memory 1530 may store instructions or data related to at least one of the other elements of the electronic device 1501. According to an embodiment of the present disclosure, the memory 1530 may store software and/or a program 1540. The program 1540 may include, for example, a kernel 1541, a middleware 1543, an application programming interface (API) 1545, and/or an application program (or an application) 1547. At least a portion of the kernel 1541, the middleware 1543, or the API 1545 may be referred to as an operating system (OS).

The kernel 1541 may control or manage system resources (e.g., the bus 1510, the processor 1520, the memory 1530, or the like) used to perform operations or functions of other programs (e.g., the middleware 1543, the API 1545, or the application program 1547). Furthermore, the kernel 1541 may provide an interface for allowing the middleware 1543, the API 1545, or the application program 1547 to access individual elements of the electronic device 1501 in order to control or manage the system resources.

The middleware 1543 may serve as an intermediary so that the API 1545 or the application program 1547 communicates and exchanges data with the kernel 1541.

Furthermore, the middleware 1543 may handle one or more task requests received from the application program 1547 according to a priority order. For example, the middleware 1543 may assign at least one application program 1547 a priority for using the system resources (e.g., the bus 1510, the processor 1520, the memory 1530, or the like) of the electronic device 1501. For example, the middleware 1543 may handle the one or more task requests according to the priority assigned to the at least one application, thereby performing scheduling or load balancing with respect to the one or more task requests.

The API 1545, which is an interface for allowing the application 1547 to control a function provided by the kernel 1541 or the middleware 1543, may include, for example, at least one interface or function (e.g., instructions) for file control, window control, image processing, character control, or the like.

The input/output interface 1550 may include various input/output circuitry and serve to transfer an instruction or data input from a user or another external device to (an)other element(s) of the electronic device 1501. Furthermore, the input/output interface 1550 may output instructions or data received from (an)other element(s) of the electronic device 1501 to the user or another external device.

The display 1560 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto. The display 1560 may present various content (e.g., a text, an image, a video, an icon, a symbol, or the like) to the user. The display 1560 may include a touch screen, and may receive a touch, gesture, proximity or hovering input from an electronic pen or a part of a body of the user.

The communication interface 1570 may include various communication circuitry and set communications between the electronic device 1501 and an external device (e.g., a first external electronic device 1502, a second external electronic device 1504, or a server 1506). For example, the communication interface 1570 may be connected to a network 1562 via wireless communications or wired communications so as to communicate with the external device (e.g., the second external electronic device 1504 or the server 1506).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1564. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 1501 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 1562 may include at least one of telecommunications networks, for example, a computer network (e.g., local area network (LAN) or wide area network (WAN)), the Internet, or a telephone network.

The types of the first external electronic device 1502 and the second external electronic device 1504 may be the same as or different from the type of the electronic device 1501. According to an embodiment of the present disclosure, the server 1506 may include a group of one or more servers. A portion or all of operations performed in the electronic device 1501 may be performed in one or more other electronic devices (e.g., the first electronic device 1502, the second external electronic device 1504, or the server 1506). When the electronic device 1501 should perform a certain function or service automatically or in response to a request, the electronic device 1501 may request at least a portion of functions related to the function or service from another device (e.g., the first electronic device 1502, the second external electronic device 1504, or the server 1506) instead of or in addition to performing the function or service for itself. The other electronic device (e.g., the first electronic device 1502, the second external electronic device 1504, or the server 1506) may perform the requested function or additional function, and may transfer a result of the performance to the electronic device 1501. The electronic device 1501 may use a received result itself or additionally process the received result to provide the requested function or service. To this end, for example, a cloud computing technology, a distributed computing technology, or a client-server computing technology may be used.

Figure 16:
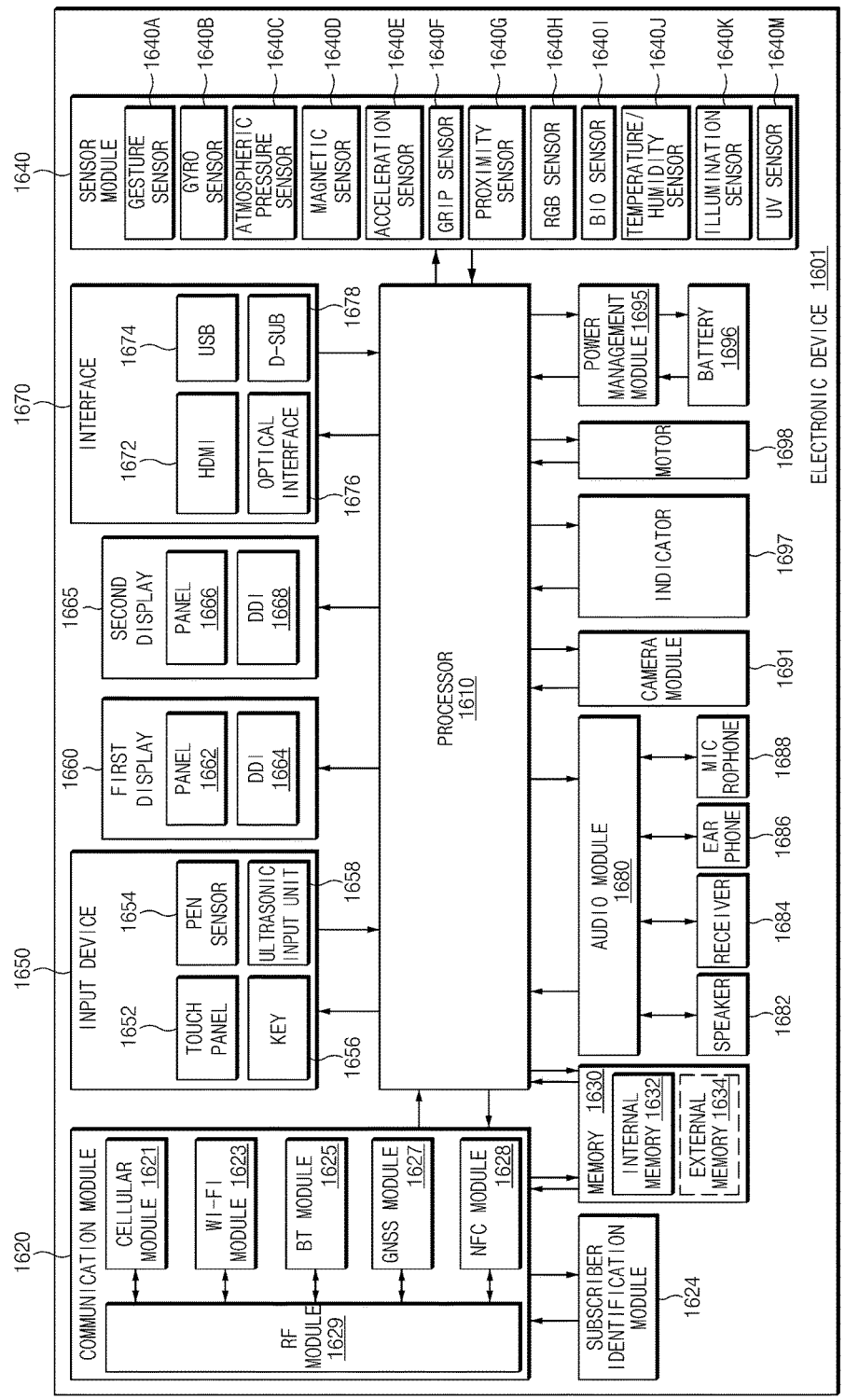
FIG. 16 is a block diagram illustrating an example electronic device according to an example embodiment of the present disclosure.

FIG. 16 is a block diagram illustrating an example electronic device 1601 according to an example embodiment of the present disclosure.

An electronic device 1601, for example, may include the whole part or a portion of the electronic device 1501 of FIG. 15. The electronic device 1601 may include at least one processor (e.g., an application processor (AP)) (e.g., including processing circuitry) 1610, a communication module (e.g., including communication circuitry) 1620, a subscriber identification module (SIM) card 1624, a memory 1630, a sensor module 1640, an input device (e.g., including input circuitry) 1650, a first display 1660, a second display 1665, an interface (e.g., including interface circuitry) 1670, an audio module 1680, a camera module 1691, a power management module 1695, a battery 1696, an indicator 1697, or a motor 1698.

The processor 1610 may include various processing circuitry and run an operating system or an application program so as to control a plurality of hardware or software elements connected to the processor 1610, and may process various data and perform operations. The processor 1610 may be implemented with, for example, a system on chip (SoC). According to an embodiment of the present disclosure, the processor 1610 may further include a graphic processing unit (GPU) and/or an image signal processor. The processor 1610 may include at least a portion (e.g., a cellular module 1621) of the elements illustrated in FIG. 16. The processor 1610 may load, on a volatile memory, an instruction or data received from at least one of other elements (e.g., a nonvolatile memory) to process the instruction or data, and may store various data in a nonvolatile memory.

The communication module 1620 may have a configuration that is the same as or similar to that of the communication interface 1570 of FIG. 15. The communication module 1620 may include various communication circuitry, such as, for example, and without limitation, a cellular module 1621, a Wi-Fi module 1623, a Bluetooth (BT) module 1625, a GNSS module 1627 (e.g., a GPS module, a GLONASS module, a BeiDou module, or a Galileo module), a NFC module 1628, and a radio frequency (RF) module 1629.

The cellular module 1621 may provide, for example, a voice call service, a video call service, a text message service, or an Internet service through a communication network. The cellular module 1621 may identify and authenticate the electronic device 1601 in the communication network using the subscriber identification module 1624 (e.g., a SIM card). The cellular module 1621 may perform at least a part of functions that may be provided by the processor 1610. The cellular module 1621 may include a communication processor (CP).

Each of the Wi-Fi module 1623, the Bluetooth module 1625, the GNSS module 1627 and the NFC module 1628 may include, for example, a processor for processing data transmitted/received through the modules. According to some various embodiments of the present disclosure, at least a part (e.g., two or more) of the cellular module 1621, the Wi-Fi module 1623, the Bluetooth module 1625, the GNSS module 1627, and the NFC module 1628 may be included in a single integrated chip (IC) or IC package.

The RF module 1629 may transmit/receive, for example, communication signals (e.g., RF signals). The RF module 1629 may include, for example, a transceiver, a power amp module (PAM), a frequency filter, a low noise amplifier (LNA), an antenna, or the like. According to another embodiment of the present disclosure, at least one of the cellular module 1621, the Wi-Fi module 1623, the Bluetooth module 1625, the GNSS module 1627, or the NFC module 1628 may transmit/receive RF signals through a separate RF module.

The SIM 1624 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1630 (e.g., the memory 1530) may include, for example, an internal memory 1632 and/or an external memory 1634. The internal memory 1632 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1634 may include a flash drive such as a compact flash (CF), a secure digital (SD), a Micro-SD, a Mini-SD, an extreme digital (xD), a MultiMediaCard (MMC), a memory stick, or the like. The external memory 1634 may be operatively and/or physically connected to the electronic device 1601 through various interfaces.

The sensor module 1640 may, for example, measure physical quantity or detect an operation state of the electronic device 1601 and convert the measured or detected information into an electrical signal. The sensor module 1640 may include, for example, at least one of a gesture sensor 1640A, a gyro sensor 1640B, a barometric pressure (e.g., atmospheric pressure) sensor 1640C, a magnetic sensor 1640D, an acceleration sensor 1640E, a grip sensor 1640F, a proximity sensor 1640G, a color sensor 1640H (e.g., a red/green/blue (RGB) sensor), a biometric (e.g., bio) sensor 1640I, a temperature/humidity sensor 1640J, an illumination sensor 1640K, or an ultraviolet (UV) sensor 1640M. Additionally or alternatively, the sensor module 1640 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1640 may further include a control circuit for controlling at least one sensor included therein. In some various embodiments of the present disclosure, the electronic device 1601 may further include a processor configured to control the sensor module 1640 as a part of the processor 1610 or separately, so that the sensor module 1640 is controlled while the processor 1610 is in a sleep state.

The input device 1650 may include various input circuitry, such as, for example, and without limitation, a touch panel 1652, a (digital) pen sensor 1654, a key 1656, or an ultrasonic input device 1658. The touch panel 1652 may employ at least one of capacitive, resistive, infrared, and ultraviolet sensing methods. The touch panel 1652 may further include a control circuit. The touch panel 1652 may further include a tactile layer so as to provide a haptic feedback to a user.

The (digital) pen sensor 1654 may include, for example, a sheet for recognition which is a part of a touch panel or is separate. The key 1656 may include, for example, a physical button, an optical button, or a keypad. The ultrasonic input device 1658 may sense ultrasonic waves generated by an input tool through a microphone 1688 so as to identify data corresponding to the ultrasonic waves sensed.

In an embodiment, the display (e.g., the display 1560) may include a first display 1660 or a second display 1665. The first display 1660 may include a first panel 1662, and a first display driver IC (DDI) configured to control the first panel 1662. The first panel 1662 may have a plurality of pixels, and each of the pixels may include sub-pixels (lower pixels) that display red, green, and blue (RGB) which are three primary colors. Each of the sub-pixels may include at least one transistor, and a pixel may be adjusted to express a color based on a voltage (or a flowing current) applied to the transistor. A first DDI 1664 may include a gate driver circuit part that has an on/off function and controls a gate of a sub-pixel and a source driver circuit part that makes a difference of color by adjusting an image signal of the sub-pixel, and may provide an entire screen while adjusting a transistor of the sub-pixel of the first panel 1662. The first DDI 1664 may receive a first image data from the processor 1610, and may be operated such that an image may be displayed in the first panel 1662.

The second display 1665 may include a second panel 1662, and a second display driver IC (DDI) configured to control the second panel 1666. The second panel 1666 may have a plurality of pixels, and each of the pixels may include sub-pixels that display red, green, and blue (RGB) which are three primary colors. Each of the sub-pixels may include at least one transistor, and a pixel may be adjusted to express a color based on a voltage (or a flowing current) applied to the transistor. A second DDI 1668 may include a gate driver circuit part that has an on/off function and controls a gate of a sub-pixel and a source driver circuit part that makes a difference of color by adjusting an image signal of the sub-pixel, and may provide an entire screen while adjusting a transistor of the sub-pixel of the second panel 1666. The second DDI 1668 may receive a first image data, which is the same as or different form the first image data, from the processor 1610, and may be operated such that an image may be displayed in the second panel 1666.

In various embodiments, at least one of the first panel 1662 or the second panel 1666, for example, may be implemented to be flat, flexible, or bendable. At least one of the first panel 1662 or the second panel 1666 may include at least one module of a touch panel 1652 and/or a pen sensor 1654.

According to an embodiment, the first panel 1662 or the second panel 1666 may include a pressure sensor (for a force sensor) that may measure the magnitude of a pressure for a touch of the user. The pressure sensor may be implemented integrally with the touch panel 1652 or may be implemented by one or more sensors that are separate from the touch panel 1652.

A first display 1660 and a second display 1665 (e.g., the display 1560) may include another image output manner (a hologram device or a projector) (not illustrated) and/or a control circuit for controlling the same.

In embodiments that implement a device including a plurality of displays, at least some of the contents (for example, image data or an image data stream) that are changed by various module and devices of the electronic device 1601 may be processed by using the processor 1610. The processor 1610 may determine that the changed contents are output on at least one of the first display 1660 or the second display 1665. For example, the first display 1660 may output a command received from the communication module 1620, and the second display 1665 may output a command received from the sensor module 1640. In another embodiment, the contents output from the first display 1660 may be displayed after being converted to the screen of the second display and/or being expanded or the contents output from the second display 1665 may be displayed after being converted to the screen of the first display 1660 and/or being expanded.

The interface 1670 may include various interface circuitry, such as, for example, and without limitation, an HDMI 1672, a USB 1674, an optical interface 1676, or a D-subminiature (D-sub) 1678. The interface 1670, for example, may be included in the communication interface 1570 illustrated in FIG. 15. Additionally or alternatively, the interface 1670 may include, for example, a mobile high-definition link (MHL) interface, an SD card/multi-media card (MMC) interface, or an infrared data association (IrDA) interface.

The audio module 1680 may convert, for example, a sound into an electrical signal or vice versa. At least a portion of elements of the audio module 1680 may be included in the input/output interface 1550 illustrated in FIG. 15. The audio module 1680 may process sound information input or output through a speaker 1682, a receiver 1684, an earphone 1686, or the microphone 1688.

The camera module 1691 is, for example, a device for shooting a still image or a video. According to an embodiment of the present disclosure, the camera module 1691 may include at least one image sensor (e.g., a front sensor or a rear sensor), a lens, an image signal processor (ISP), or a flash (e.g., an LED or a xenon lamp).

The power management module 1695 may manage power of the electronic device 1601. According to an embodiment of the present disclosure, the power management module 1695 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, or the like. The motor 1698 may convert an electrical signal into a mechanical vibration, and may generate a vibration or haptic effect. Although not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 17:
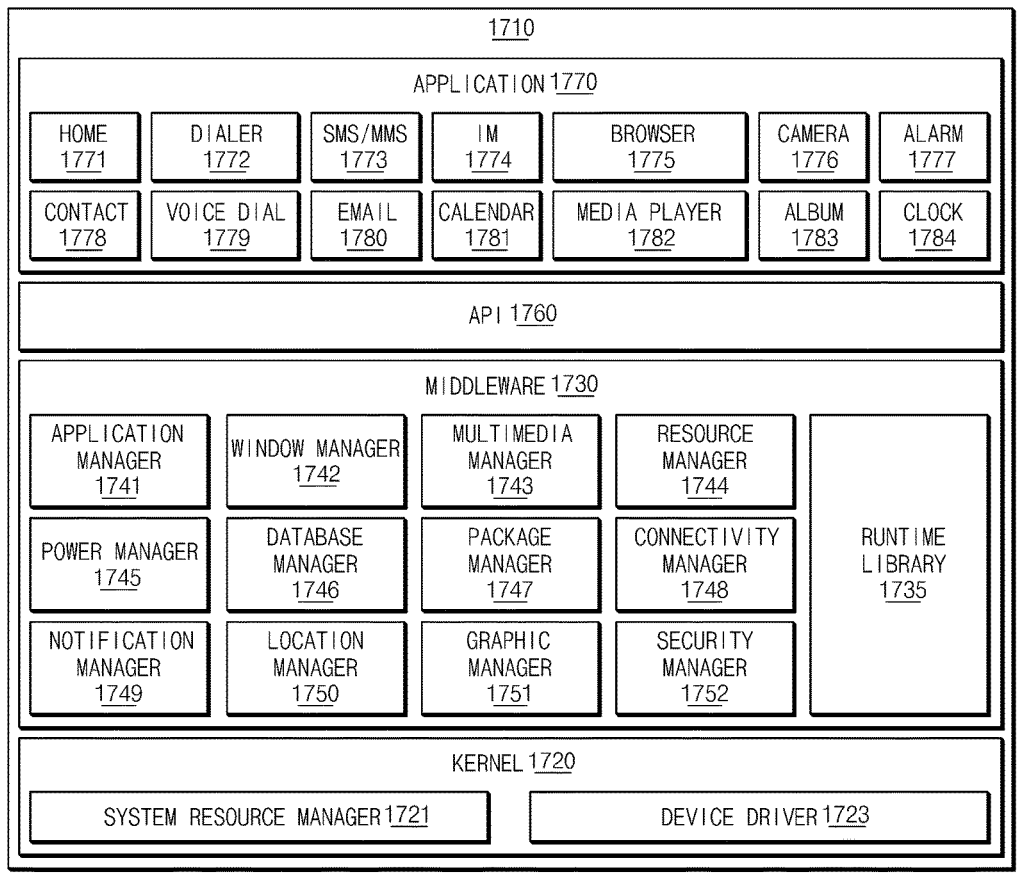
FIG. 17 is a block diagram illustrating an example program module according to an example embodiment of the present disclosure.

FIG. 17 is a block diagram illustrating an example program module according to an example embodiment of the present disclosure.

Referring to FIG. 17, a program module 1710 (e.g., the program 1540) may include an operating system (OS) for controlling a resource related to an electronic device (e.g., the electronic device 1501) and/or various applications (e.g., the application program 1547) running on the OS. The operating system may be, for example, Android, iOS, Windows, Symbian, Tizen, or the like.

The program module 1710 may include a kernel 1720, a middleware 1730, an API 1760, and/or an application 1770.

At least a part of the program module 1710 may be preloaded on an electronic device or may be downloaded from an external electronic device (e.g., the first electronic device 1502, the second external electronic device 1504, or the server 1506).

The kernel 1720 (e.g., the kernel 1541) may include, for example, a system resource manager 1721 or a device driver 1723. The system resource manager 1721 may perform control, allocation, or retrieval of a system resource. According to an embodiment of the present disclosure, the system resource manager 1721 may include a process management unit, a memory management unit, a file system management unit, or the like. The device driver 1723 may include, for example, a display driver, a camera driver, a Bluetooth driver, a shared memory driver, a USB driver, a keypad driver, a Wi-Fi driver, an audio driver, or an inter-process communication (IPC) driver.

The middleware 1730, for example, may provide a function that the applications 1770 require in common, or may provide various functions to the applications 1770 through the API 1760 so that the applications 1770 may efficiently use limited system resources in the electronic device. According to an embodiment of the present disclosure, the middleware 1730 (e.g., the middleware 1543) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, and a security manager 1752.

The runtime library 1735 may include, for example, a library module that a complier uses to add a new function through a programming language while the application 1770 is running. The runtime library 1735 may perform a function for input/output management, memory management, or an arithmetic function.

The application manager 1741 may mange, for example, a life cycle of at least one of the applications 1770. The window manager 1742 may manage a GUI resource used in a screen. The multimedia manager 1743 may recognize a format required for playing various media files and may encode or decode a media file using a codec matched to the format. The resource manager 1744 may manage a resource such as a source code, a memory, or a storage space of at least one of the applications 1770.

The power manager 1745, for example, may operate together with a basic input/output system (BIOS) to manage a battery or power and may provide power information required for operating the electronic device. The database manager 1746 may generate, search, or modify a database to be used in at least one of the applications 1770. The package manager 1747 may manage installation or update of an application distributed in a package file format.

The connectivity manger 1748 may manage wireless connection of Wi-Fi, Bluetooth, or the like. The notification manager 1749 may display or notify an event such as message arrival, appointments, and proximity alerts in such a manner as not to disturb a user. The location manager 1750 may manage location information of the electronic device. The graphic manager 1751 may manage a graphic effect to be provided to a user or a user interface related thereto. The security manager 1752 may provide various security functions required for system security or user authentication. According to an embodiment of the present disclosure, in the case in which an electronic device (e.g., the electronic device 1501) includes a phone function, the middleware 1730 may further include a telephony manager for managing a voice or video call function of the electronic device.

The middleware 1730 may include a middleware module for forming a combination of various functions of the above-mentioned elements. The middleware 1730 may provide a module specialized for each type of an operating system to provide differentiated functions. Furthermore, the middleware 1730 may delete a part of existing elements or may add new elements dynamically.

The API 1760 (e.g., the API 1545) which is, for example, a set of API programming functions may be provided in different configurations according to an operating system. For example, in the case of Android or iOS, one API set may be provided for each platform, and, in the case of Tizen, at least two API sets may be provided for each platform.

The application 1770 (e.g., the application program 1547), for example, may include at least one application capable of performing functions such as a home 1771, a dialer 1772, an SMS/MMS 1773, an instant message (IM) 1774, a browser 1775, a camera 1776, an alarm 1777, a contact 1778, a voice dial 1779, an e-mail 1780, a calendar 1781, a media player 1782, an album 1783, a clock 1784, health care (e.g., measure an exercise amount or blood sugar), or environmental information provision (e.g., provide air pressure, humidity, or temperature information).

According to an embodiment of the present disclosure, the application 1770 may include an information exchange application for supporting information exchange between the electronic device (e.g., the electronic device 1501) and an external electronic device (e.g., the first electronic device 1502 or the second external electronic device 1504). The information exchange application may include, for example, a notification relay application for relaying specific information to the external electronic device or a device management application for managing the external electronic device.

For example, the notification relay application may have a function for relaying, to an external electronic device (e.g., the first electronic device 1502 or the second external electronic device 1504), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1502 or the second external electronic device 1504) communicating with the electronic device, an application running in the external electronic device, or a service (e.g., a call service, a message service, or the like) provided from the external electronic device.

According to an embodiment of the present disclosure, the application 1770 may include a specified application (e.g., a healthcare application of a mobile medical device) according to an attribute of the external electronic device (e.g., the first electronic device 1502 or the second external electronic device 1504). The application 1770 may include an application received from an external electronic device (e.g., the first electronic device 1502 or the second external electronic device 1504). The application 1770 may include a preloaded application or a third-party application downloadable from a server. The names of the elements of the program module 1710 illustrated may vary with the type of an operating system.

According to various embodiments of the present disclosure, at least a part of the program module 1710 may be implemented with software, firmware, hardware, or a combination thereof. At least a part of the program module 1710, for example, may be implemented (e.g., executed) by a processor (e.g., the processor 1610). At least a part of the program module 1710 may include, for example, a module, a program, a routine, sets of instructions, or a process for performing at least one function.

According to various example embodiments of the present disclosure, an internal space utilizing issue of the electronic device may be addressed by arranging the antenna at a location at which the antenna overlaps a display area of the display.

Further, according to the embodiments of the present disclosure, the radiation performance of an antenna may be secured utilizing a second antenna as a sub-antenna of the first antenna.

In addition, the present disclosure may provide various effects that are directly or indirectly recognized.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of a dedicated processor, a CPU, an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1520), the processor may perform functions corresponding to the instructions. The computer-readable storage medium may be, for example, the memory 1530.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to certain embodiments thereof, it will be understood by those skilled in the art that various changes in form and details may be made therein without departing from the scope of the present disclosure. Therefore, the scope of the present disclosure should not be defined as being limited to the example embodiments, but should be defined by the appended claims and equivalents thereof.

What is claimed is:

1. An electronic device comprising:
  a housing comprising a first surface facing a first direction, a second surface facing a second direction opposite the first direction, and a side surface at least partially surrounding a space between the first surface and the second surface;
  a touch screen display positioned inside the housing and exposed through the first surface, wherein the display comprises a display panel and a touch panel that is separated from or integrated with the display panel;
  a conductor forming at least a portion of the side surface;
  at least one substantially transparent conductive pattern integrated into the display;
  a ground interposed between the first surface and the second surface;
  a wireless communication circuit including a port electrically coupled to the conductor; and
  a processor electrically coupled to the display and the wireless communication circuit,
  wherein the substantially transparent conductive pattern is electrically coupled to at least one of the port of the wireless communication circuit and the ground.

2. The electronic device of claim 1, wherein the touch panel comprises a repeated pattern of conductive islands, and the conductive pattern is substantially coplanar with the repeated pattern.

3. The electronic device of claim 2, wherein the repeated pattern and the conductive pattern comprise the same material.

4. The electronic device of claim 2, wherein the repeated pattern and the conductive pattern are comprise an ITO electrode.

5. The electronic device of claim 2, wherein the touch panel comprises a first region and a second region when viewed from above the first surface,
  wherein the first region comprises a first repeated pattern of conductive islands,
  wherein the second region comprises a second repeated pattern of conductive islands, and
  wherein the second repeated pattern is less dense than the first repeated pattern, and the conductive pattern is disposed in the second region.

6. The electronic device of claim 5, wherein the first surface comprises a first side having a first length, a second side having a second length longer than the first length, a third side having the first length, and a fourth side having the second length,
  wherein the first side is perpendicular to the second side and the fourth side and is parallel to the third side, and
  wherein the second region abuts the first side, a portion of the second side, and a portion of the fourth side opposite from the portion of the second side.

7. An electronic device comprising:
  a housing comprising a first surface facing a first direction, a second surface facing a second direction opposite to the first direction, and a side surface at least partially surrounding a portion of a space between the first surface and the second surface;
a touch screen display disposed inside the housing and exposed to the outside through the first surface, wherein the display comprises a display panel and a touch panel that is separated from or integrated with the display panel;
a first conductor forming at least a portion of the side surfaces;
at least one other conductor disposed in the interior of the display to be adjacent to the touch panel and comprising a substantially transparent conductive pattern;
a ground that is disposed between the first surface and the second surface;
a wireless communication circuit comprising a port that is electrically connected with the first conductor; and
a processor that is electrically connected with the display and the wireless communication circuit,
wherein the conductive pattern is electrically connected with at least one of the port of the wireless communication circuit and the ground.

8. The electronic device of claim 7, wherein the at least one other conductor is electrically connected with the first conductor.

9. The electronic device of claim 7, wherein the at least one other conductor includes a slot in an area thereof.

10. The electronic device of claim 7, wherein a second conductor is disposed adjacent to a lower end of the touch panel, and
wherein a third conductor is disposed adjacent to an upper end of the touch panel.

11. The electronic device of claim 10, wherein the second conductor is connected to the ground or the third conductor through a switch.

12. The electronic device of claim 11, wherein the second conductor is connected to the third conductor through the switch,
wherein at least one of the second conductor or the third conductor is configured to function as a first antenna while the switch is opened, and
wherein the second conductor and the third conductor are electrically connected to each other and configured to function as a second antenna while the switch is closed.

13. The electronic device of claim 10, wherein at least one of the second conductor or the third conductor is electrically connected to the ground through a connector comprising a flexible material.

14. The electronic device of claim 13, wherein the connector comprises a flexible printed circuit board or a conductive tape.

15. The electronic device of claim 13, wherein the connector is fixed to the ground through a fixing structure.

16. The electronic device of claim 15, wherein the fixing structure comprises a C-clip.

17. The electronic device of claim 7, wherein a second conductor is disposed adjacent to an upper end of the touch panel,
wherein a third conductor is disposed adjacent to a lower end of the touch panel,
wherein a fourth conductor is disposed adjacent to a left end of the touch panel, and
wherein a fifth conductor is disposed adjacent to a right end of the touch panel.

18. The electronic device of claim 7, wherein the at least one other conductor comprises a repeated pattern of conductive islands that are electrically isolated from the conductive pattern, and the conductive islands are electrically connected with a touch control circuit configured to function as a touch sensor.

19. The electronic device of claim 18, wherein a density of the repeated pattern of the conductive islands included in the at least one other conductor is lower than a density of the repeated pattern of the electrodes that are configured to function as the touch sensor included in the touch panel.

20. The electronic device of claim 19, wherein if a touch input is detected through the repeated pattern of the conductive islands, the processor is configured to output at least one display object in an area that overlaps the conductor including the repeated pattern of the conductive islands, in an area of an area that overlaps the touch panel.

* * * * *